US012720456B2

(12) United States Patent
Wang et al.

(10) Patent No.: US 12,720,456 B2
(45) Date of Patent: Aug. 25, 2026

(54) TIMING ADVANCE INDICATION METHOD, COMMUNICATION APPARATUS, AND STORAGE MEDIUM

(71) Applicant: HUAWEI TECHNOLOGIES CO., LTD., Shenzhen (CN)

(72) Inventors: Xiaolu Wang, Hangzhou (CN); Hejia Luo, Hangzhou (CN); Rong Li, Hangzhou (CN); Bin Wang, Hangzhou (CN); Jun Wang, Hangzhou (CN)

(73) Assignee: Huawei Technologies Co., LTD., Shenzhen (CN)

( * ) Notice: Subject to any disclaimer, the term of this patent is extended or adjusted under 35 U.S.C. 154(b) by 461 days.

(21) Appl. No.: 17/708,896

(22) Filed: Mar. 30, 2022

(65) Prior Publication Data

US 2022/0225259 A1 Jul. 14, 2022

Related U.S. Application Data

(63) Continuation of application No. PCT/CN2020/115346, filed on Sep. 15, 2020.

(30) Foreign Application Priority Data

Sep. 30, 2019 (CN) ......................... 201910944749.4

(51) Int. Cl.
*H04W 56/00* (2009.01)
*H04L 27/26* (2006.01)
(Continued)

(52) U.S. Cl.
CPC ... *H04W 56/0045* (2013.01); *H04L 27/26025* (2021.01); *H04W 56/009* (2013.01);
(Continued)

(58) Field of Classification Search
CPC ........... H04W 56/0045; H04W 56/009; H04W 72/23; H04W 74/085; H04W 84/06;
(Continued)

(56) References Cited

U.S. PATENT DOCUMENTS

2018/0279186 A1* 9/2018 Park .................... H04W 36/302
2018/0352527 A1* 12/2018 Wang ................ H04W 56/0045
(Continued)

FOREIGN PATENT DOCUMENTS

CN 102811115 A 12/2012
CN 103348746 A 10/2013
(Continued)

OTHER PUBLICATIONS

3GPP TS 38.321 "Medium Access Control (MAC) protocol specification", V 15.3.0 (Sep. 2018) (Year: 2018).*
(Continued)

*Primary Examiner* — Derrick W Ferris
*Assistant Examiner* — Jesse P. Samluk
(74) *Attorney, Agent, or Firm* — Fish & Richardson P.C.

(57) ABSTRACT

The present disclosure relates to timing advance indication methods, communication apparatuses, and storage medium. In one example method, a first device determines a quantity of extended bits and a location of the extended bit of a timing advance (TA) instruction based on a subcarrier spacing of a second device. The first device sends the TA instruction to the second device, where the TA instruction includes the extended bit, and a quantity of bits of the TA instruction is greater than 12.

20 Claims, 13 Drawing Sheets

(51) Int. Cl.
*H04W 72/23* (2023.01)
*H04W 74/0833* (2024.01)
*H04W 84/06* (2009.01)

(52) U.S. Cl.
CPC ......... *H04W 72/23* (2023.01); *H04W 74/085* (2013.01); *H04W 84/06* (2013.01)

(58) Field of Classification Search
CPC .............. H04W 56/004; H04W 56/005; H04L 27/26025; H04L 27/2602; H04B 7/18563; H04B 7/2656
See application file for complete search history.

(56) References Cited

U.S. PATENT DOCUMENTS

| | | | | |
|---|---|---|---|---|
| 2019/0342845 | A1* | 11/2019 | Laselva | H04L 1/1812 |
| 2020/0295824 | A1* | 9/2020 | Charbit | H04L 1/1864 |
| 2021/0029658 | A1* | 1/2021 | Mahalingam | H04W 56/0005 |

FOREIGN PATENT DOCUMENTS

| | | | |
|---|---|---|---|
| CN | 107197517 | A | 9/2017 |
| CN | 109391966 | A | 2/2019 |
| CN | 109495961 | A | 3/2019 |
| CN | 109699051 | A | 4/2019 |
| CN | 109842932 | A | 6/2019 |
| CN | 110089165 | A | 8/2019 |
| CN | 112399546 | A | 2/2021 |
| EP | 2916603 | A1 | 9/2015 |
| EP | 3435696 | A1 | 1/2019 |
| WO | 2019069240 | A1 | 4/2019 |
| WO | 2019097922 | A1 | 5/2019 |
| WO | 2019101186 | A1 | 5/2019 |
| WO | 2019125681 | A1 | 6/2019 |
| WO | 2019149050 | A1 | 8/2019 |

OTHER PUBLICATIONS

3GPP TS 38.213 V15.7.0 (Sep. 2019), "3rd Generation Partnership Project; Technical Specification Group Radio Access Network; NR; Physical layer procedures for control (Release 15)," Sep. 2017, 108 pages.

3GPP TS 38.321 V15.7.0 (Sep. 2019), "3rd Generation Partnership Project; Technical Specification Group Radio Access Network; NR; Medium Access Control (MAC) protocol specification (Release 15)," Sep. 2019, 78 pages.

Chunting et al., "A Preliminary Study on the Integration of Satellite Communications and Ground 5G (I)," retrieved from URL: <https://www.sohu.com/a/256569268_466840>, Sep. 27, 2018, 15 pages (English translation).

Huawei, HiSilicon, "Discussion on timing advance and RACH procedures for NTN," 3GPP TSG RAN WG1 Meeting #96bis, R1-1904000, Xi'an, China, Apr. 8-12, 2019, 7 pages.

Huawei, HiSilicon, "Discussion on timing advance and RACH for NTN," 3GPP TSG RAN WG1 Meeting #97, R1-1905994, Reno, USA, May 13-17, 2019, 10 pages.

Nokia, Nokia Shanghai Bell, "Doppler Compensation, Uplink Timing Advance and Random Access in NTN," 3GPP TSG RAN WG1 #99, R1-1913017, Reno, USA, Nov. 18-22, 2019, 28 pages.

Office Action issued in Chinese Application No. 201910944749.4 on Nov. 2, 2021, 9 pages (with English translation).

PCT International Search Report and Written Opinion issued in International Application No. PCT/CN2020/115346 on Dec. 15, 2020, 16 pages (with English translation).

Spreadtrum Communications, "Asymmetric UL and DL frame timing at gNB side," 3GPP TSG-RAN WG2 Meeting #106, R2-1905689, Reno, USA, May 13-17, 2019, 4 pages.

ZTE, "Summary of 7.2.5.3 on UL timing and PRACH," 3GPP TSG RAN WG1 #96bis, R1-1905732, Xi'an, China, Apr. 8-12, 2019, 8 pages.

Extended European Search Report in European Appln No. 20871769.4, dated Oct. 20, 2022, 5 pages.

* cited by examiner

| Field | Quantity of bits |
|---|---|
| Frequency hopping mark | 1 |
| Physical uplink shared channel frequency resource allocation | 14 |
| Physical uplink shared channel time resource allocation | 4 |
| Modulation and coding scheme | 4 |
| Physical uplink shared channel transmit power control instruction | 3 |
| Channel state information request | 1 |

FIG. 10

TIMING ADVANCE INDICATION METHOD, COMMUNICATION APPARATUS, AND STORAGE MEDIUM

CROSS-REFERENCE TO RELATED APPLICATIONS

This application is a continuation of International Application No. PCT/CN2020/115346, filed on Sep. 15, 2020, which claims priority to Chinese Patent Application No. 201910944749.4, filed on Sep. 30, 2019. The disclosures of the aforementioned applications are hereby incorporated by reference in their entireties.

TECHNICAL FIELD

This application relates to the field of communication technologies, and in particular, to a timing advance indication method, a communication apparatus, and a storage medium.

BACKGROUND

With development of communication technologies, a 5G new radio (New Radio, NR) technology has entered a commercial deployment stage. Currently, released NR technical standards are designed for terrestrial communication systems. Currently, the 3rd generation partnership project (3rd Generation Partnership Project, 3GPP) organization is leading various research institutes and companies to participate in research on a non-terrestrial network (Non-Terrestrial Networks, NTN) communication standard.

However, in a terrestrial network, an altitude difference between a terminal and a network device is not large, but in an NTN, an altitude difference between a terminal and a network device is comparatively large, and consequently, a round-trip transmission delay or a round-trip transmission delay difference of a signal in the NTN is comparatively large. The comparatively large round-trip transmission delay or round-trip transmission delay difference leads to a comparatively large timing advance (Timing Advance, TA) value sent by the network device to the terminal. Consequently, a range of a TA value indicated by a TA instruction in a conventional technology may not meet a requirement of the NTN.

SUMMARY

This application provides a timing advance indication method, a communication apparatus, and a storage medium, to increase a range of a TA value indicated by a TA instruction, so that a requirement of an NTN system can be met.

According to a first aspect, this application provides a timing advance indication method. Specifically, a TA instruction sent by a first device (for example, a network device) to a second device (for example, a terminal) may include two parts: a first part and a second part. The first part is an extended bit of the TA instruction. The second part is a bit part of a TA instruction in a conventional technology. When a range of a TA value that can be indicated by the existing TA instruction cannot meet a requirement of an NTN system, the first device (for example, the network device) determines a quantity of extended bits and a location of the extended bit of the TA instruction based on a subcarrier spacing of the second device (for example, the terminal), and sends the TA instruction including the first part and the second part to the second device. In other words, a combination of the second part and the first part represents a TA value indicated by the TA instruction. The TA instruction is used to indicate a round-trip transmission delay or a round-trip transmission delay difference between the first device and the second device. A quantity of bits of the TA instruction is greater than 12. According to the solution provided in this embodiment, bits of the TA instruction are extended, and a range of the TA value indicated by the TA instruction is effectively increased, so that the requirement of the NTN system can be met.

In a possible design, the first device determines the quantity of extended bits and the location of the extended bit of the TA instruction based on the subcarrier spacing of the second device and a size of a cell to which the second device belongs. According to the solution provided in this embodiment, the first device can send TA instructions to second devices in different cells, to provide communication services for the second devices in the different cells.

In a possible design, the quantity of extended bits and the location of the extended bit include at least one of the following: one bit reserved in a random access response RAR, two bits reserved in a backoff indicator BI, one bit reserved in an uplink grant UL-grant, at least one bit reused in a temporary cell radio network temporary identifier TC-RNTI, or one bit represented by whether a slot number corresponding to the RAR is an odd number or an even number. Bits of the TA instruction can be extended by using the reserved bit, the reused bit of the TC-RNTI, or the one bit represented by whether the slot number corresponding to the RAR is an odd number or an even number, so that the TA instruction can indicate a TA value in a larger range, and the requirement of the NTN system is met. In addition, the range of the TA value indicated by the TA instruction can be further increased by combining a plurality of types of bits.

In a possible design, the at least one bit corresponding to the TC-RNTI is a low-order bit of the TA value indicated by the TA instruction. According to the solution provided in this embodiment, the terminal and the network device in different scenarios may use one or more bits implicitly represented by the TC-RNTI, so that resource utilization is improved.

According to a second aspect, this application provides a timing advance indication method. The method includes: A second device receives a TA instruction from a first device, where the TA instruction includes an extended bit, the TA instruction is used to indicate a round-trip transmission delay or a round-trip transmission delay difference between the first device and the second device, and a quantity of bits of the TA instruction is greater than 12; and the second device determines a quantity of extended bits and a location of the extended bit of the TA instruction based on a subcarrier spacing of the second device. The second device obtains the quantity of extended bits and the location of the extended bit in the TA instruction through parsing based on the subcarrier spacing of the second device, and further, the second device obtains, with reference to the extended bit and an existing second part, a TA value indicated by the TA instruction. Therefore, compared with a TA value that can be indicated by the existing second part, the second device can receive a larger TA value. When the first device and the second device are communication devices in an NTN system, through extension of the TA instruction, a range of the TA value indicated by the TA instruction can be effectively increased, so that a requirement of the NTN system can be met.

In a possible design, after the second device determines the quantity of extended bits and the location of the extended bit of the TA instruction based on the subcarrier spacing of the second device, the method further includes: The second device sends data to the first device based on the TA value indicated by the TA instruction.

In a possible design, that the second device determines a quantity of extended bits and a location of the extended bit of the TA instruction based on a subcarrier spacing of the second device includes: The second device determines the quantity of extended bits and the location of the extended bit of the TA instruction based on the subcarrier spacing of the second device and a size of a cell to which the second device belongs.

In a possible design, the quantity of extended bits and the location of the extended bit include at least one of the following: one bit reserved in a random access response RAR, two bits reserved in a backoff indicator BI, one bit reserved in an uplink grant UL-grant, at least one bit reused in a temporary cell radio network temporary identifier TC-RNTI, or one bit represented by whether a slot number corresponding to the RAR is an odd number or an even number.

In a possible design, the at least one bit corresponding to the TC-RNTI is a low-order bit of the TA value indicated by the TA instruction.

According to a third aspect, this application provides a timing advance indication method. The method includes: A first device determines, based on a subcarrier spacing of a second device, a scaling value corresponding to a TA value indicated by a TA instruction; and the first device sends the TA instruction to the second device, where the scaling value is used to adjust a range of the TA value indicated by the TA instruction. The scaling value corresponding to the TA value indicated by the TA instruction is determined by using the subcarrier spacing. Because the scaling value can be used to adjust the range of the TA value indicated by the TA instruction, a TA value capable of indicating a larger range can be determined based on the TA value indicated by the TA instruction and the scaling value, so that a requirement of an NTN system can be met.

In a possible design, that a first device determines, based on a subcarrier spacing of a second device, a scaling value corresponding to a TA value indicated by a TA instruction includes: The first device determines, based on the subcarrier spacing of the second device and a size of a cell to which the second device belongs, the scaling value corresponding to the TA value indicated by the TA instruction.

In a possible design, the method further includes: The first device sends indication information to the second device, where the indication information is used to indicate whether the TA value corresponds to a scaling value. According to the solution provided in this embodiment, flexibility of the scaling value can be increased.

In a possible design, the indication information includes at least one of the following: a reserved bit in a random access response RAR, a reserved bit in a backoff indicator BI, a reserved bit in an uplink grant UL-grant, at least one bit corresponding to a temporary cell radio network temporary identifier TC-RNTI, or one bit represented by whether a slot number corresponding to the RAR is an odd number or an even number.

According to a fourth aspect, this application provides a timing advance indication method. The method includes: A second device receives a TA instruction sent by a first device; and the second device determines, based on a subcarrier spacing of the second device, a scaling value corresponding to a TA value indicated by the TA instruction, where the scaling value is used to adjust a range of the TA value indicated by the TA instruction. The scaling value corresponding to the TA value indicated by the TA instruction is determined by using the subcarrier spacing. Because the scaling value can be used to adjust the range of the TA value indicated by the TA instruction, a TA value capable of indicating a larger range can be determined based on the TA value indicated by the TA instruction and the scaling value, so that a requirement of an NTN system can be met.

In a possible design, after the second device determines, based on the subcarrier spacing of the second device, the scaling value corresponding to the TA value indicated by the TA instruction, the method further includes: The second device determines, based on the TA value indicated by the TA instruction and the scaling value, a TA value used by the second device to send data to the first device.

In a possible design, that the second device determines, based on a subcarrier spacing of the second device, a scaling value corresponding to a TA value indicated by the TA instruction includes: The second device determines, based on the subcarrier spacing of the second device and a size of a cell to which the second device belongs, the scaling value corresponding to the TA value indicated by the TA instruction.

In a possible design, the method further includes: The second device receives indication information from the first device, where the indication information is used to indicate whether the TA value corresponds to a scaling value. According to the solution provided in this embodiment, flexibility of the scaling value can be increased.

In a possible design, the indication information includes at least one of the following: a reserved bit in a random access response RAR, a reserved bit in a backoff indicator BI, a reserved bit in an uplink grant UL-grant, at least one bit corresponding to a temporary cell radio network temporary identifier TC-RNTI, or one bit represented by whether a slot number corresponding to the RAR is an odd number or an even number.

According to a fifth aspect, this application provides a communication apparatus, including a module, component, or circuit configured to implement the method according to the first aspect, the second aspect, the third aspect, or the fourth aspect.

According to a sixth aspect, this application provides a communication apparatus, including:

a processor and a transceiver, where the processor and the transceiver communicate with each other through an internal connection; and the processor is configured to perform a processing step in the method according to the first aspect, the second aspect, the third aspect, or the fourth aspect, and the transceiver is configured to perform a receiving/sending step in the method according to the first aspect, the second aspect, the third aspect, or the fourth aspect.

In a possible design, the communication apparatus in the sixth aspect may be a network device or a terminal, or may be a component (for example, a chip or a circuit) of the network device or the terminal.

In another possible design, the communication apparatus in the sixth aspect may further include a memory. The memory is configured to store a computer program. The processor is configured to execute the computer program stored in the memory, to enable the communication apparatus to perform the method according to the first aspect, the second aspect, the third aspect, or the fourth aspect.

According to a seventh aspect, this application provides a communication apparatus, including an input interface circuit, a logic circuit, and an output interface circuit. The logic circuit is configured to perform the method according to the first aspect, the second aspect, the third aspect, or the fourth aspect.

According to an eighth aspect, this application provides a computer-readable storage medium. The computer-readable storage medium stores a computer program, and the computer program includes instructions used to perform the method according to the first aspect, the second aspect, the third aspect, or the fourth aspect.

According to a ninth aspect, this application provides a computer program. The computer program includes instructions used to perform the method according to the first aspect, the second aspect, the third aspect, or the fourth aspect.

In a possible design, the program in the ninth aspect may be completely or partially stored on a storage medium packaged with a processor, or may be partially or completely stored on a memory that is not packaged with a processor.

According to a tenth aspect, an embodiment of this application further provides a system, including the communication apparatus according to the fifth aspect, the sixth aspect, or the seventh aspect.

According to an eleventh aspect, an embodiment of this application further provides a processor. The processor includes at least one circuit, configured to perform the method according to the first aspect, the second aspect, the third aspect, or the fourth aspect.

According to a twelfth aspect, an embodiment of this application further provides a communication apparatus. The communication apparatus includes a memory and a processor. The memory is configured to store a computer program. The processor is configured to execute the computer program stored in the memory, to enable the communication apparatus to perform the method according to the first aspect, the second aspect, the third aspect, or the fourth aspect.

It can be learned that, in the foregoing aspects, the first device determines the quantity of extended bits and the location of the extended bit of the timing advance TA instruction based on the subcarrier spacing of the second device, and sends the TA instruction to the second device, where the TA instruction is used to indicate the round-trip transmission delay or the round-trip transmission delay difference between the first device and the second device, the TA instruction includes the extended bit, and the quantity of bits of the TA instruction is greater than 12. A quantity of bits of the existing TA instruction is 12, and therefore, compared with the existing TA instruction, the TA instruction in this application includes a larger quantity of bits, and can indicate a TA value in a larger range. When the first device and the second device are communication devices in an NTN system, through extension of the TA instruction, a range of the TA value indicated by the TA instruction can be effectively increased, so that a requirement of the NTN system can be met.

BRIEF DESCRIPTION OF DRAWINGS

FIG. 10 is a schematic diagram of a frame format of a UL-grant instruction in a conventional technology;

DETAILED DESCRIPTION OF THE DISCLOSED EMBODIMENTS

Terms used in an implementation part of this application are only used to explain specific embodiments of this application, and are not intended to limit this application.

Figure 1:
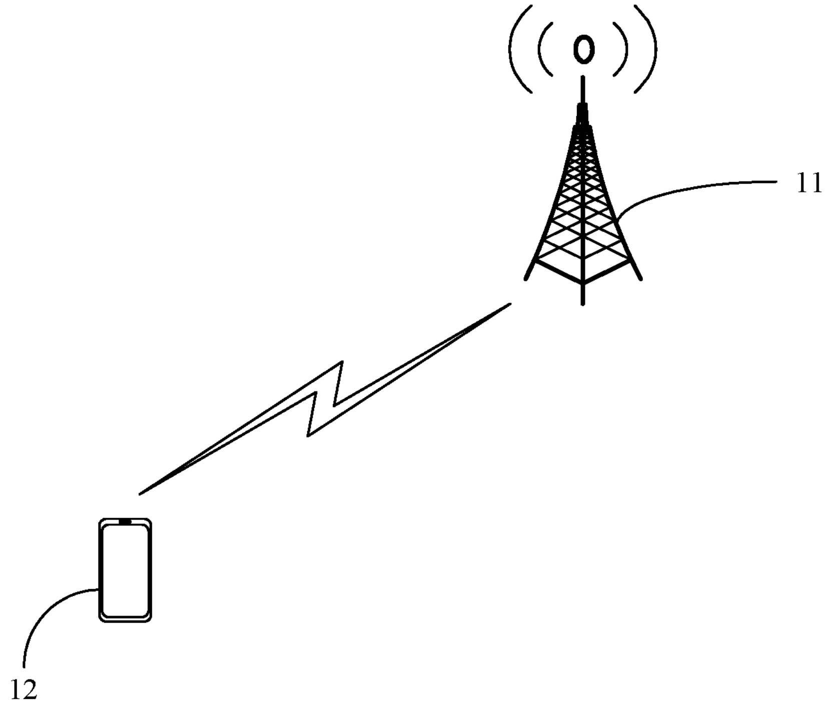
FIG. 1 is a schematic diagram of an application scenario according to an embodiment of this application.

Embodiments of this application may be applied to various types of communication systems. FIG. 1 is a schematic diagram of an application scenario according to an embodiment of this application. A communication system shown in FIG. 1 mainly includes a network device 11 and a terminal 12.

(1) The network device 11 may be a network side device, for example, an access point (Access Point, AP) of a wireless local area network (Wireless Local Area Network, WLAN), an evolved NodeB (Evolved NodeB, eNB or eNodeB) of 4G, or a base station of next generation communication, for example, a 5G new radio access technology (New Radio Access Technology, NR) base station (next generation NodeB, gNB), a small cell, or a micro cell, or may be a relay station, a transmission reception point (Transmission and Reception Point, TRP), or a roadside unit (Road Side Unit, RSU). In embodiments, base stations in communication systems of different communication standards are different. For distinction, a base station in a 4G communication system is referred to as a long term evolution (Long Term Evolution, LTE) eNB, a base station in a 5G communication system is referred to as an NR gNB, and a base station that supports both a 4G communication system and a 5G communication system is referred to as an evolved long term evolution (Evolutional Long Term Evolution, eLTE) eNB. These names are only used for ease of differentiation, but are not intended for limitation.

(2) The terminal 12 is also referred to as user equipment (User Equipment, UE), and is a device that provides voice and/or data connectivity for a user, for example, a handheld device with a wireless connection function, a vehicle-mounted device, or a vehicle with a vehicle to vehicle (vehicle to vehicle, V2V) communication capability. Common terminals include, for example, a mobile phone, a tablet computer, a notebook computer, a palmtop computer, a mobile internet device (mobile internet device, MID), and a wearable device such as a smartwatch, a smart band, or a pedometer.

(3) "A plurality of" means two or more, and another quantifier is similar to this. The term "and/or" describes a correspondence between associated objects and represents that three relationships may exist. For example, A and/or B may represent the following three cases: Only A exists, both A and B exist, and only B exists. The character "/" generally indicates an "or" relationship between associated objects.

It should be noted that a quantity of terminals 12 and a type of the terminal 12 included in the communication system shown in FIG. 1 are merely examples, and this embodiment of this application is not limited thereto. For example, more terminals 12 that communicate with the network device 11 may be further included. For brevity, details are not described in the accompanying drawings. In addition, in the communication system shown in FIG. 1, although the network device 11 and the terminal 12 are shown, the communication system may not be limited to including the network device 11 and the terminal 12, for example, may further include a core network node or a device used for bearing a virtualized network function. This is clear for a person of ordinary skill in the art, and details are not described herein.

In addition, the embodiments of this application may be applied to communication systems such as a 4G wireless communication system, a vehicle-to-everything (vehicle to everything, V2X) communication system, a device-to-device (Device-to-Device, D2D) communication system, and a subsequently evolved system of LTE, and may also be applied to a next-generation wireless communication system, namely, a 5G communication system, and applied to other systems that may appear in the future, for example, a next-generation Wi-Fi network, a 5G internet of vehicles, and an NTN system.

It should be noted that, with continuous evolution of communication systems, names of the foregoing network elements may change in the other systems that may appear in the future. In this case, solutions provided in the embodiments of this application are also applicable.

Figure 2:
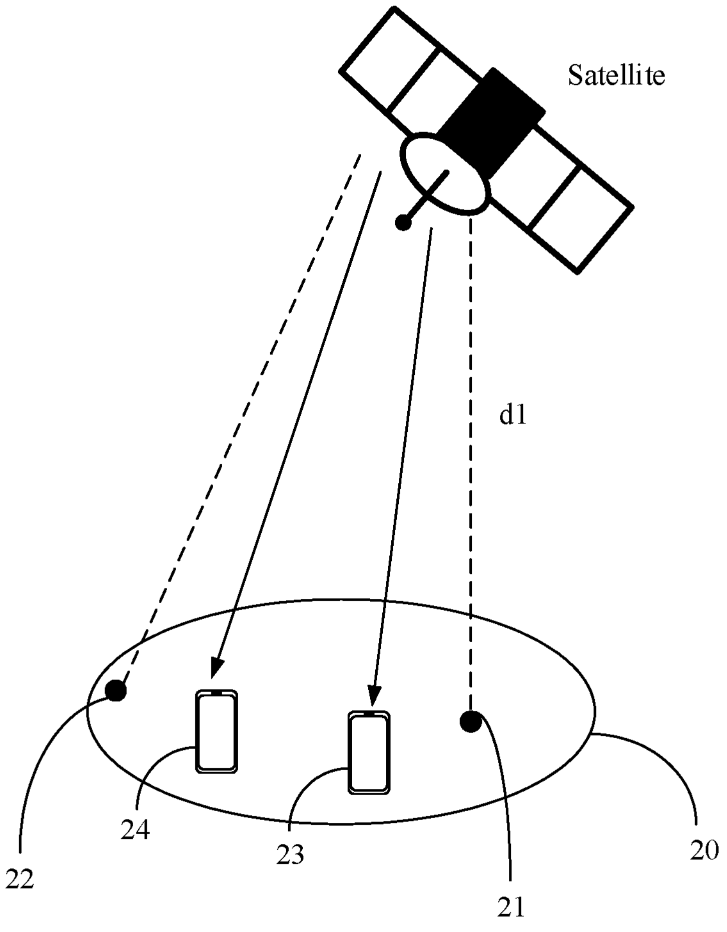
FIG. 2 is a schematic diagram of a satellite communication system according to an embodiment of this application.

The following uses an NTN system as an example. The NTN system may be specifically a satellite communication system or another non-terrestrial network system. In this embodiment, a satellite communication system shown in FIG. 2 is used as an example. 20 represents a coverage area of a satellite, and there may be a plurality of terminals in the coverage area. The coverage area may be an area covered by one or more beams of a satellite, or an area at a same level as a cell in an NR system. 21 represents a reference point in the coverage area. Specifically, the reference point may be a point closest to the satellite in the coverage area, and the reference point 21 may also be referred to as a near end. 22 represents any point other than the reference point in the coverage area. For example, 22 represents a point farthest from the satellite in the coverage area, and in this case, the point 22 may also be referred to as a far end. A terminal 23 and a terminal 24 are any two terminals in the coverage area. Because the terminal is comparatively far from the satellite, a round-trip transmission delay of a signal between the terminal and the satellite is comparatively large. In some cases, a distance between the near end and the satellite may be used as a common transmission distance in the coverage area 20. Correspondingly, during round-trip transmission of a signal over the common transmission distance, a common round-trip transmission delay is generated. Herein, the common round-trip transmission delay is referred to as a common TA value. A difference between the round-trip transmission delay of the signal between the terminal and the satellite and the common round-trip transmission delay may be referred to as a round-trip transmission delay difference.

In the NTN system, a terminal is comparatively far from a network device (for example, a base station), for example, an altitude difference between the base station or a satellite and the terminal is usually greater than 500 kilometers. Therefore, a round-trip transmission delay of a terminal in a same cell in the NTN system is far greater than a round-trip transmission delay of a terminal in a same cell in a terrestrial communication system (for example, an NR system), and a round-trip transmission delay difference of the terminal in the same cell in the NTN system is also far greater than a round-trip transmission delay difference of the terminal in the same cell in the terrestrial communication system (for example, the NR system). A larger round-trip transmission delay or round-trip transmission delay difference leads to a larger timing advance (Timing Advance, TA) value sent by the network device to the terminal. It can be understood that one cell in the NTN system may be a projection region of one beam of the satellite on the ground, or may be a projection region of a plurality of beams of the satellite on the ground, or may be a part of a projection region of one or more beams on the ground.

Figure 3:
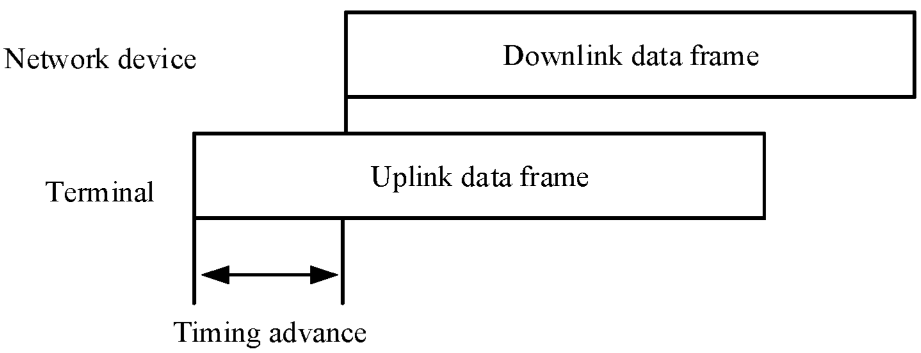
FIG. 3 is a schematic diagram of synchronization between an uplink data frame and a downlink data frame in a conventional technology.
Figure 4:
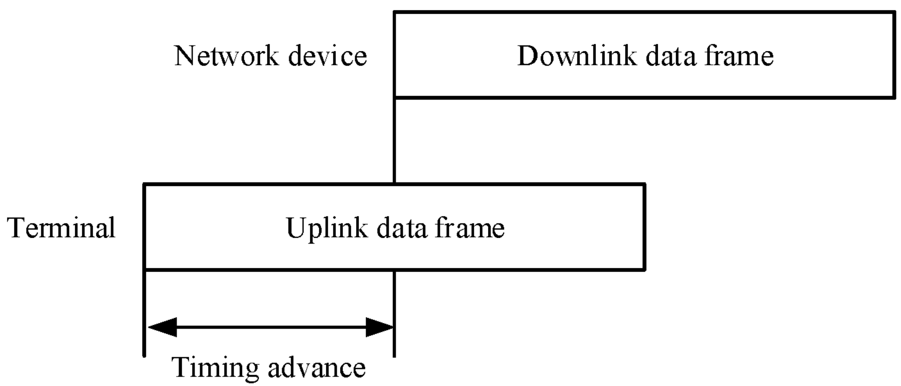
FIG. 4 is another schematic diagram of synchronization between an uplink data frame and a downlink data frame in a conventional technology.

FIG. 3 shows a timing advance in an NR system. To be specific, an uplink data frame sent by a terminal is transmitted before a downlink data frame corresponding to the terminal, and time by which the uplink data frame is transmitted earlier than the downlink data frame is referred to as the timing advance TA. A TA value reflects a round-trip transmission delay of a signal between the terminal and a network device in the NR system. FIG. 4 shows a timing advance in an NTN system, and a TA value reflects a round-trip transmission delay of a signal between a terminal and a network device in the NTN system. Through comparison between FIG. 3 and FIG. 4, it can be learned that the timing advance in the NTN system is greater than the timing advance in the NR system. Consequently, it is possible that a range of a TA value indicated by a TA instruction in a conventional technology cannot meet a requirement of NTN.

Figure 5:
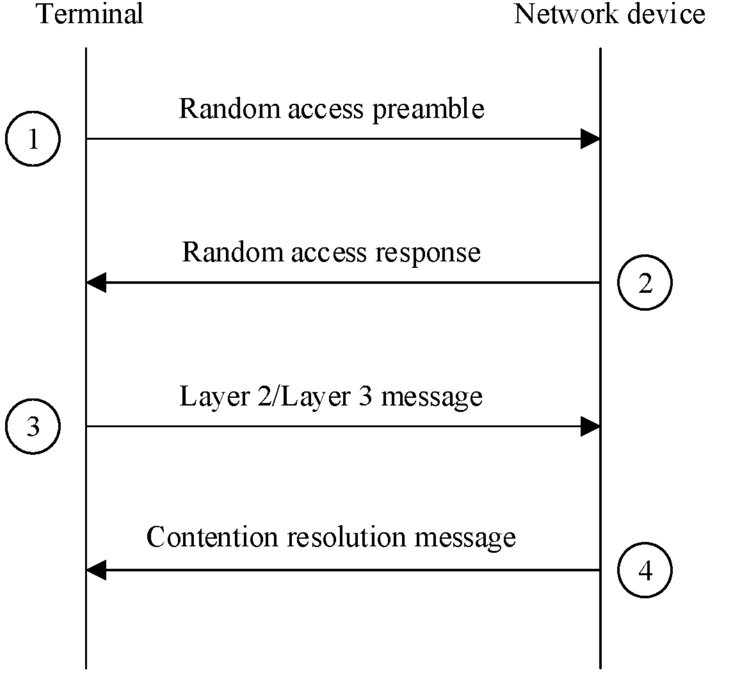
FIG. 5 shows a random access procedure in an LTE/NR protocol in a conventional technology.

For example, FIG. 5 shows a process in which a terminal applies for network access in an NR system. Specifically, in step 1, the terminal sends a random access preamble to a network device, where the random access preamble may be specifically a preamble sequence selected by the terminal from a specified set; in step 2, the network device sends a random access response (Random Access Response, RAR) to the terminal, where the random access response may include a preamble sequence identifier, a TA value, an uplink grant (Uplink Grant, UL-grant), and a temporary cell radio network temporary identifier (Temporary Cell-Radio Network Temporary Identifier, TC-RNTI); in step 3, the terminal sends a layer 2/layer 3 (Layer 2/Layer 3, L2/L3) message to the network device, where the L2/L3 message may include a C-RNTI and a terminal identifier; and in step 4, the network device sends a contention resolution message to the terminal. In some cases, before sending the random access preamble, the terminal further needs to obtain a downlink synchronization and random access channel occasion (Random Access Channel Occasion, RO) configuration with the network device.

Figure 6:
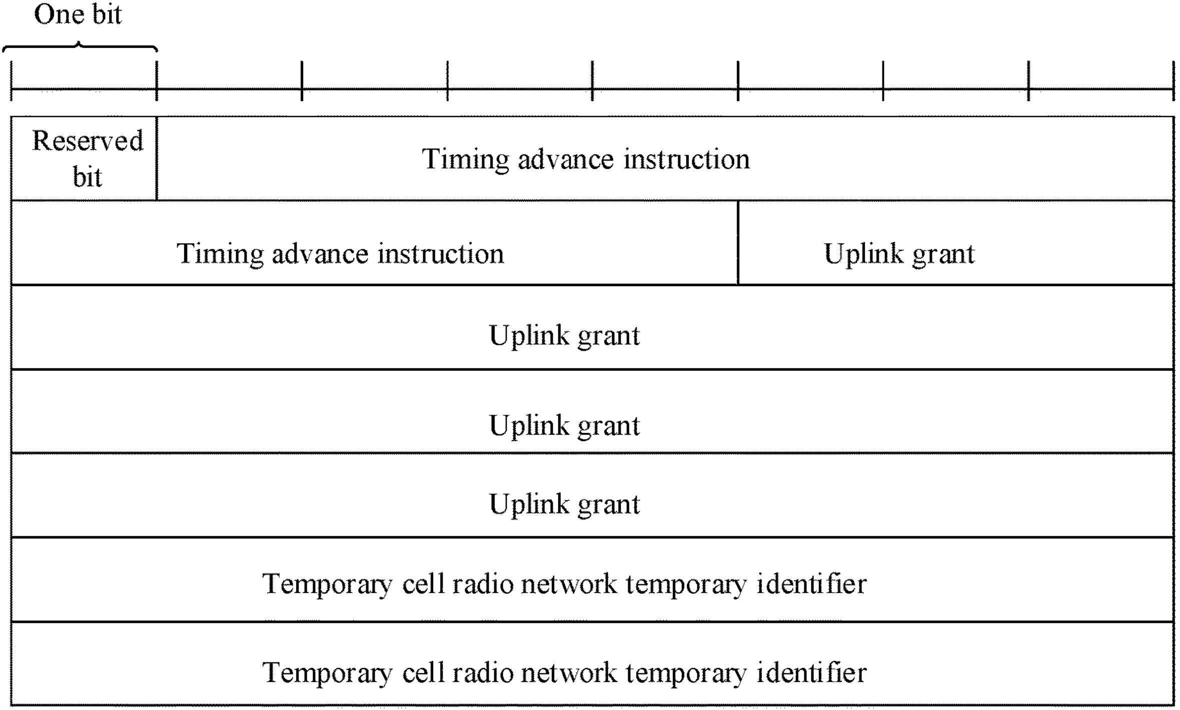
FIG. 6 is a schematic diagram of a frame format of RAR information in a conventional technology.

FIG. 6 shows a frame format of a RAR, and a TA instruction occupies 12 bits. Herein, a TA value indicated by the TA instruction is denoted by $T_A$. After receiving the TA instruction sent by the network device, the terminal may calculate a TA time adjustment value $N_{TA}$ based on the TA value $T_A$ indicated by the TA instruction. $N_{TA}=T_A\cdot 16\cdot 64/2^{\mu}\cdot T_c$, where $T_c=0.509\times 10^{-6}$ milliseconds, a maximum represented value of $T_A$ is 3846, and $\mu$ is related to a subcarrier spacing (Sub Carrier Spacing, SCS). Specifically, a larger subcarrier spacing indicates larger $\mu$ and smaller corresponding $N_{TA}$. The subcarrier spacing herein is a subcarrier spacing for sending a first piece of uplink data by the terminal after receiving the RAR. It can be understood that, before the network device sends the RAR to the terminal, the network device has configured the subcarrier spacing of the terminal for the terminal. In other words, before the RAR is sent, both the network device and the terminal know the subcarrier spacing of the terminal. It can be understood that, when the subcarrier spacing is 15 kHz, a maximum value of $N_{TA}$ can be calculated based on the maximum value 3846 of $T_A$, and the maximum value of $N_{TA}$ is approximately 2 milliseconds. Table 1 below shows a correspondence between a subcarrier spacing, a value of $\mu$, and a maximum value of $N_{TA}$.

TABLE 1

| Value of $\mu$ | Subcarrier spacing | Maximum value of $N_{TA}$ (milliseconds) |
|---|---|---|
| 0 | 15 kHz | 2.0046 |
| 1 | 30 kHz | 1.0023 |
| 2 | 60 kHz | 0.50115 |
| 3 | 120 kHz | 0.25057 |
| 4 | 240 kHz | 0.12529 |

Figure 7:
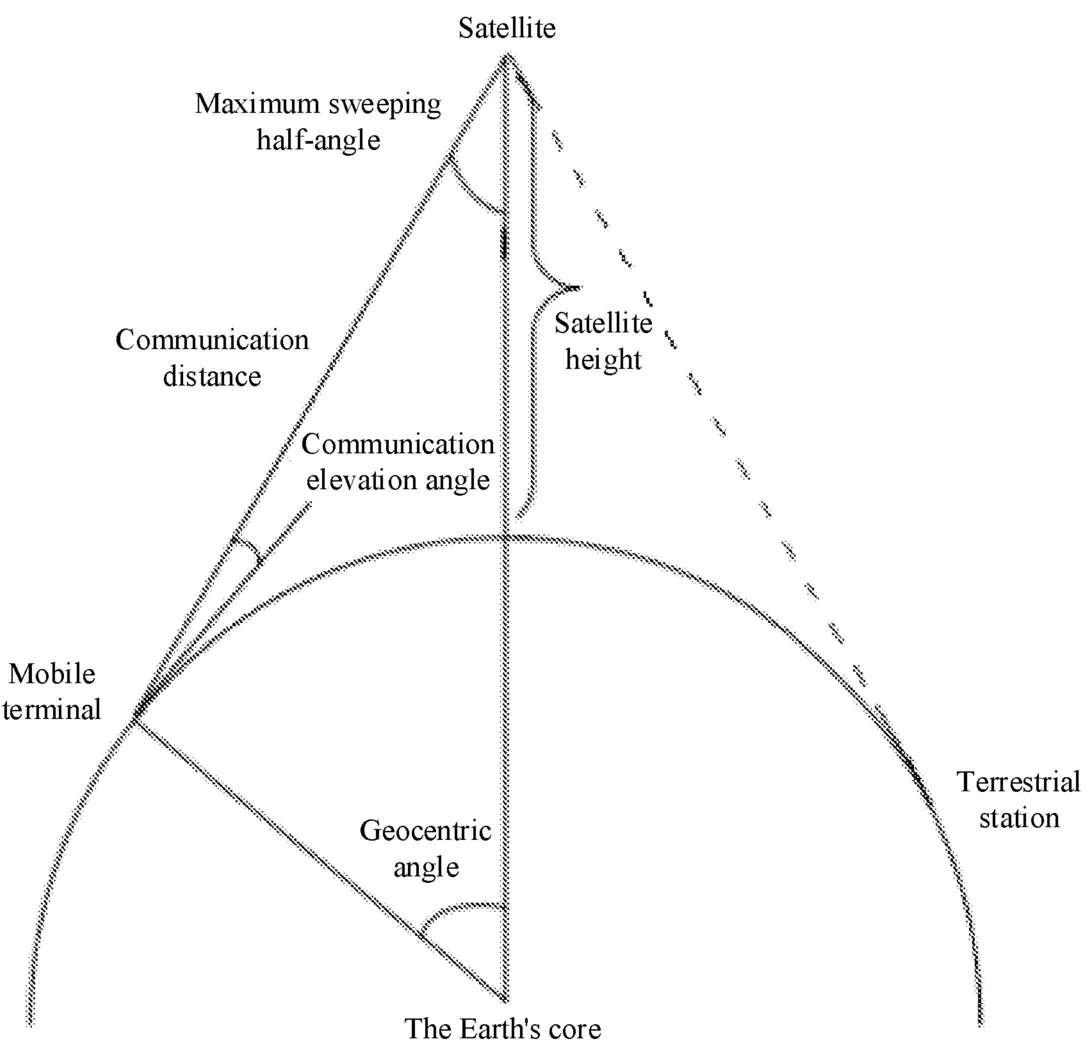
FIG. 7 is a schematic diagram of a satellite communication system in a conventional technology.

It can be learned from Table 1 that, as the subcarrier spacing increases, the maximum value of $N_{TA}$ decreases by a factor of 2. When the subcarrier spacing is 240 kHz, the maximum value of $N_{TA}$ is 0.12529 milliseconds. However, in the NTN system, in some scenarios, time that can be represented by $N_{TA}$ needs to be greater than time that can be represented by $N_{TA}$ in the NR system. For example, based on a satellite orbit height, satellite communication systems may be classified into a geosynchronous orbit (Geostationary Earth Orbit, GEO) system, a medium earth orbit (Medium Earth Orbit, MEO) satellite communication system, and a low earth orbit (Low Earth Orbit, LEO) satellite communication system. The GEO satellite communication system, the MEO satellite communication system, or the LEO satellite communication system includes cells of different sizes. Herein, a cell diameter is used to measure a cell size. Generally, a cell diameter in a satellite communication system is within a preset range, for example, 100 kilometers to 1500 kilometers. Several values of the cell diameter are used as examples below for description. As shown in Table 2, in the GEO satellite communication system, when a cell diameter is 500 kilometers and a minimum elevation angle of the terminal is 10 degrees, maximum time that can be represented by $N_{TA}$ needs to be 3.2557 milliseconds, whereas a maximum value that can be indicated by $N_{TA}$ corresponding to a TA value indicated by an existing TA instruction is only 2.0046 milliseconds. In other words, the TA value indicated by the existing TA instruction cannot meet a requirement of the NTN system. For another example, in the LEO satellite communication system, when a cell diameter is 200 kilometers and a minimum elevation angle of the terminal is 10 degrees, maximum time that can be represented by $N_{TA}$ needs to be 1.3076 milliseconds, and when the subcarrier spacing of the terminal is greater than 15 kHz, $N_{TA}$ corresponding to a TA value indicated by an existing TA instruction cannot meet a requirement of this scenario. In the LEO satellite communication system, when a cell diameter is 100 kilometers and a minimum elevation angle of the terminal is 10 degrees, maximum time that can be represented by $N_{TA}$ needs to be 0.655 milliseconds, and when the subcarrier spacing of the terminal is greater than 30 kHz, $N_{TA}$ corresponding to the TA value indicated by the existing TA instruction cannot meet a requirement of this scenario. An elevation angle of the terminal may be specifically a communication elevation angle shown in FIG. 7.

TABLE 2

| Type of a satellite communication system | Cell diameter | Maximum value that needs to be represented by $N_{TA}$ (milliseconds) |
|---|---|---|
| GEO | 500 kilometers | 3.2557 |
| LEO-1200 | 200 kilometers | 1.3076 |
| LEO-600 | 100 kilometers | 0.655 |

To resolve the foregoing problem that the TA value indicated by the existing TA instruction cannot meet the requirement of the NTN system, the embodiments of this application provide a timing advance indication method. The timing advance indication method is described below with reference to specific embodiments.

Figures 8, 9:
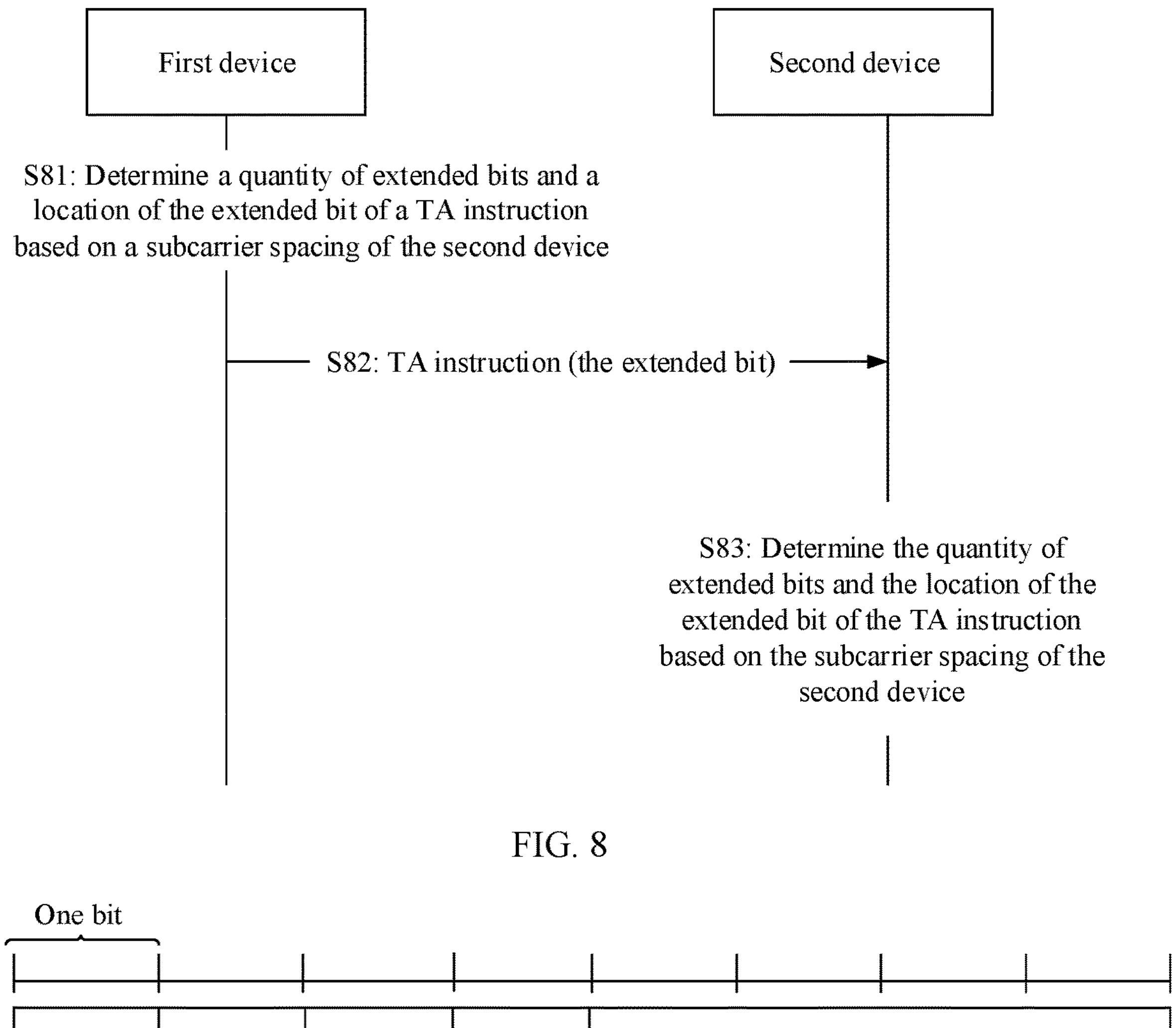
FIG. 8 is a flowchart of a timing advance indication method according to an embodiment of this application.
FIG. 9 is a schematic diagram of a frame format of a BI instruction in a conventional technology.

FIG. 8 is a flowchart of a timing advance indication method according to an embodiment of this application. As shown in FIG. 8, the timing advance indication method in this embodiment includes the following steps.

S81: A first device determines a quantity of extended bits and a location of the extended bit of a timing advance TA instruction based on a subcarrier spacing of a second device.

In this embodiment, the first device may be a network device, and the second device may be a terminal. Alternatively, the first device may be a terminal, and the second device may be a network device. Descriptions are provided below by using an example in which the first device is a network device and the second device is a terminal. In addition, it should be noted that the TA instruction in this embodiment includes two parts: a first part and a second part. The first part is determined based on the subcarrier spacing. The second part is a TA instruction in a conventional technology, that is, the 12-bit part shown in FIG. 6. The first part may be considered as an extended part or the extended bit of the TA instruction, and the quantity of extended bits and the location of the extended bit may be determined based on the subcarrier spacing. Specifically, the extended bit may be a reserved bit, a reused bit, or an implicitly represented bit in an existing field, an existing instruction, or existing signaling. The network device and the terminal may agree on a correspondence between the subcarrier spacing and the extended bit in advance.

When the network device needs to send the TA instruction to the terminal, the network device determines whether a TA value indicated by the existing 12-bit TA instruction can meet a requirement of an NTN system. If the TA value cannot meet the requirement, the network device determines, based on the subcarrier spacing of the terminal, the extended bit corresponding to the subcarrier spacing, and uses the extended bit as the extended bit of the TA instruction, that is, the first part. The extended bit and the existing 12-bit part constitute the TA instruction. Therefore, in this embodiment of this application, a quantity of bits of the TA instruction is greater than 12.

S82: The first device sends the TA instruction to the second device, where the TA instruction includes the extended bit, the TA instruction is used to indicate a round-trip transmission delay or a round-trip transmission delay difference between the first device and the second device, and the quantity of bits of the TA instruction is greater than 12.

It can be understood that, when the TA instruction does not require an extended bit, a range of a TA value indicated by the second part can meet a requirement for a TA value used by the second device when the second device sends a signal to the first device; and when the TA instruction requires the extended bit, a TA value indicated by the first part and the second part as a whole is used to indicate a TA value used by the second device when the second device sends a signal to the first device.

The network device sends the TA instruction to the terminal, and correspondingly, the terminal receives the TA instruction sent by the network device.

S83: The second device determines the quantity of extended bits and the location of the extended bit of the TA instruction based on the subcarrier spacing of the second device.

After the terminal receives the TA instruction sent by the network device, the terminal may determine, based on the subcarrier spacing of the terminal, the extended bit in the TA instruction, that is, the first part, for example, the quantity of extended bits and the location of the extended bit. Further, the existing 12-bit part, that is, the second part, is obtained from RAR information through parsing, the TA value indicated by the first part and the second part as a whole is determined, a time adjustment value $N_{TA}$ is calculated based on the TA value, and uplink data is sent to the network device based on $N_{TA}$. In other words, $N_{TA}$ is used as a reference value of a timing advance used by the terminal to send the uplink data.

It can be understood that, for the TA value indicated by the TA instruction in this embodiment of this application, there may be the following cases:

In a possible case, before the terminal sends a random access preamble to the network device, the network device broadcasts a common TA value. When the network device sends RAR information to the terminal after receiving the random access preamble from the terminal, a TA value indicated by a TA instruction carried in the RAR information is a difference between the common TA value and a round-trip transmission delay of a signal between the terminal and a satellite. The difference may be referred to as a round-trip transmission delay difference of the signal between the terminal and the satellite.

In another possible case, before the terminal sends a random access preamble to the network device, the network device does not broadcast a common TA value. When the network device sends RAR information to the terminal after receiving the random access preamble from the terminal, a TA value indicated by a TA instruction carried in the RAR information is a round-trip transmission delay of a signal between the terminal and a satellite.

In this embodiment, the first device determines the quantity of extended bits and the location of the extended bit of the timing advance TA instruction based on the subcarrier spacing of the second device, and sends the TA instruction to the second device, where the TA instruction is used to indicate the round-trip transmission delay or the round-trip transmission delay difference between the first device and the second device, the TA instruction includes the extended bit, and the quantity of bits of the TA instruction is greater than 12. A quantity of bits of the existing TA instruction is 12, and therefore, compared with the existing TA instruction, the TA instruction in this application includes a larger quantity of bits, and can indicate a TA value in a larger range. When the first device and the second device are communication devices in the NTN system, through extension of the TA instruction, a range of the TA value indicated by the TA instruction can be effectively increased, so that the requirement of the NTN system can be met.

Based on the foregoing embodiment, the quantity of extended bits and the location of the extended bit include the following possible cases:

In a possible case, the extended bit is a 1-bit reserved bit, that is, a reserved bit, in the RAR shown in FIG. 6.

In another possible case, the extended bit is two bits reserved in a backoff indicator (Backoff Indicator, BI) shown in FIG. 9. A BI instruction occupies eight bits, and two of the eight bits are reserved bits, that is, reserved bits. Specifically, the BI instruction may be in the RAR information, or may be sent to the terminal together with the RAR information. In addition, a BI corresponding to last four of the eight bits shown in FIG. 9 is specifically a value indicated by the BI instruction.

In still another possible case, one bit corresponding to a channel state information request in UL grant signaling shown in FIG. 10 is in a reserved state, and the one bit may be used to extend the TA instruction.

In yet another possible case, as shown in FIG. 6, TC-RNTI signaling occupies 16 bits, representing a range from 1 to 65519. The terminal may scramble sent uplink data by using a value indicated by a TC-RNTI instruction. Therefore, a bit in the TC-RNTI signaling may be reused to extend bits of the TA instruction. For example, one or more bits may be randomly selected from the 16 bits, and the one or more bits are used to represent the extended bit of the TA instruction, and are also used to represent the value indicated by the TC-RNTI signaling. In other words, the selected one or more bits are reused bits. A feasible reusing manner is as follows: A value of the reused one or more bits is first determined based on the TA value that needs to be indicated by the TA instruction, and further, a value of a remaining bit in the 16 bits is determined based on the value indicated by the TC-RNTI instruction.

In yet another possible case, when the network device sends the RAR information to the terminal, a slot number of a slot (slot) in which the RAR information is located may be an odd number, or may be an even number. It can be understood that one bit may represent two states, and correspondingly, the two states may represent one bit. Therefore, the two states, that is, whether the slot number of the slot in which the RAR information is located is an odd number or an even number, may be used to represent one extended bit of the TA instruction. In other words, whether the slot number of the slot in which the RAR information is located is an odd number or an even number may implicitly represent one bit.

It can be understood that the foregoing possible cases are merely example descriptions for extending the TA instruction, but do not limit a bit or an extension manner that may be used to extend the TA instruction. Table 3 below shows the foregoing types of bits or extension manners that may be used to extend the TA instruction. In other words, Table 3 may be used as a candidate bit pool for extending the TA instruction.

TABLE 3

| Type sequence number | Added bit |
|---|---|
| 1 | One bit reserved in a RAR |
| 2 | Two bits reserved in a BI |
| 3 | One bit reserved in a UL-grant |
| 4 | One or more bits reused in 16 bits corresponding to a TC-RNTI |
| 5 | One bit represented by whether a slot number corresponding to a RAR is an odd number or an even number |

Table 4 below lists maximum values that can be represented by $N_{TA}$ and quantities of bits that need to be added to the TA instruction in scenarios with different subcarrier spacings and different cell diameters.

TABLE 4

| | Quantity of bits that need to be added to the TA instruction | | |
|---|---|---|---|
| Subcarrier spacing | $N_{TA}$ represents a maximum of 2 milliseconds (D ≤ 300 kilometers) | $N_{TA}$ represents a maximum of 4 milliseconds (D ≤ 600 kilometers) | $N_{TA}$ represents a maximum of 8 milliseconds (D ≤ 1200 kilometers) |
| 15 kHz | N/A | 1 | 2 |
| 30 kHz | 1 | 2 | 3 |
| 60 kHz | 2 | 3 | 4 |
| 120 kHz | 3 | 4 | 5 |
| 240 kHz | 4 | 5 | 6 |

In Table 4, D represents a cell diameter. A scenario in which the cell diameter is less than or equal to 300 kilometers is used as an example. When the subcarrier spacing is 15 kHz, the existing 12-bit TA instruction can meet a requirement of the scenario. However, as the subcarrier spacing increases, 12 bits cannot meet the requirement of the scenario. Therefore, the TA instruction needs to be extended, for example, needs to be extended by one bit when the subcarrier spacing is 30 kHz. In addition, it can be learned from Table 4 that, as the cell diameter increases, the quantity of bits that need to be added is also increasing.

It can be understood that the method described in this embodiment of this application may be further applied to a terminal in an area in which a satellite beam is used as a unit. Correspondingly, D represents a satellite beam diameter, that is, a beam diameter.

Specifically, the network device may determine, based on a cell diameter of a cell in which the terminal is located and Table 4, quantities of bits that need to be extended in cases of different subcarrier spacings, and further determines, from the candidate bit pool shown in Table 3 and based on the quantity of bits that need to be extended, a bit to be used as the extended bit. In addition, the network device and the terminal may agree, in advance, on extended bits corresponding to different subcarrier spacings, including quantities of the extended bits and locations of the extended bits. Further, the network device determines, based on the subcarrier spacing of the terminal, the extended bit corresponding to the subcarrier spacing, extends, based on the extended bit, bits corresponding to the TA instruction, and sends the extended TA instruction to the terminal. After receiving the TA instruction, the terminal determines, based on the subcarrier spacing of the terminal and the extended bits that correspond to the different subcarrier spacings and that are agreed on by the terminal and the network device in advance, the extended bit corresponding to the subcarrier spacing of the terminal, determines, based on the extended bit and the existing 12 bits, the TA value indicated by the TA instruction, and uses the TA value as a reference value of a timing advance used by the terminal to send uplink data.

The following describes, with reference to several application scenarios, a correspondence between a subcarrier spacing and an extended bit and a process of interaction between the network device and the terminal.

In a possible scenario, the cell diameter of the cell in which the terminal is located is less than or equal to 300 kilometers, and a minimum elevation angle of the terminal is 10 degrees. When the subcarrier spacing is 30 kHz, 60 kHz, 120 kHz, or 240 kHz, to meet a requirement that a maximum value represented by $N_{TA}$ is 2 milliseconds, the quantity of bits that need to be added is 1, 2, 3, or 4 respectively. Further, based on the quantity of bits that need to be added, a bit to be used as the extended bit is determined from the candidate bit pool shown in Table 3. A correspondence between a subcarrier spacing and an extended bit shown in Table 5 is merely an example for description, and does not constitute a specific limitation. In another embodiment, alternatively, there may be another correspondence, for example, a correspondence shown in Table 6. It can be understood that the method described in this embodiment of this application may be further applied to a terminal in an area in which a satellite beam is used as a unit. For example, the terminal is located in an area in which a beam diameter is less than or equal to 300 kilometers.

TABLE 5

| Subcarrier spacing | $N_{TA}$ represents a maximum of 2 milliseconds Quantity of bits that need to be added to the TA instruction | Extended bit |
|---|---|---|
| 15 kHz | N/A | |
| 30 kHz | 1 | One bit reserved in a BI |
| 60 kHz | 2 | Two bits reserved in a BI |
| 120 kHz | 3 | Two bits reserved in a BI One bit reserved in a UL-grant |
| 240 kHz | 4 | Two bits reserved in a BI One bit reserved in a UL-grant One bit implicitly represented by a TC-RNTI |

TABLE 6

| Subcarrier spacing | $N_{TA}$ represents a maximum of 2 milliseconds Quantity of bits that need to be added to the TA instruction | Extended bit |
|---|---|---|
| 15 kHz | N/A | |
| 30 kHz | 1 | One bit reserved in a RAR |
| 60 kHz | 2 | Two bits reserved in a BI |
| 120 kHz | 3 | Two bits reserved in a BI<br>One bit reserved in a RAR |
| 240 kHz | 4 | Two bits reserved in a BI<br>One bit reserved in a UL-grant<br>One bit reserved in a RAR |

N/A indicates that the requirement of the NTN system can be met without adding a bit to the TA instruction. Table 5 is used as an example for description. In this scenario, a correspondence, agreed on by the network device and the terminal in advance, between a subcarrier spacing and an extended bit may be specifically the correspondence shown in Table 5. Specifically, Table 5 may be established by the network device and then sent to the terminal, or may be established by the terminal and then sent to the network device.

For example, the subcarrier spacing of the terminal is 30 kHz. The network device determines, based on the correspondence in Table 5, that one bit needs to be added to the TA instruction. In other words, the TA instruction corresponds to 13 bits, where 12 bits are the existing 12 bits in the RAR information shown in FIG. 6, and one bit is one bit reserved in the BI shown in FIG. 9. The one bit reserved in the BI may be used as a low-order bit, a high-order bit, or an intermediate bit in the 13 bits. This is not specifically limited herein. Further, the network device sends the RAR information and the BI instruction together to the terminal. After receiving the RAR information and the BI instruction, the terminal determines, based on the subcarrier spacing of the terminal and the correspondence shown in Table 5, that the one bit reserved in the BI is the extended bit of the TA instruction; further combines the one bit reserved in the BI and the existing 12 bits in the RAR information, to obtain the TA value indicated by the TA instruction; converts the TA value into the time adjustment value $N_{TA}$; and uses $N_{TA}$ as the reference value of the timing advance used by the terminal to send the uplink data.

It can be understood that, in some embodiments, the network device and the terminal may further agree, in advance, on which of the two bits reserved in the BI needs to be used to extend the TA instruction when one bit needs to be added and one bit reserved in the BI is used as the added one bit. Similarly, which of the 16 bits corresponding to the TC-RNTI is the one bit implicitly represented by the TC-RNTI may also be agreed on by the network device and the terminal in advance. An agreement manner is not specifically limited herein. For example, the agreement may be implemented by sending indication information, or may be implemented by further adding some indication information on a basis of Table 5.

In addition, as shown in Table 5, when the subcarrier spacing is 240 kHz, one bit implicitly represented by the TC-RNTI needs to be used to extend the TA instruction. In other words, any one of the 16 bits corresponding to the TC-RNTI may be used to represent both an information bit of the TA instruction and an information bit of the TC-RNTI signaling. Therefore, the one bit implicitly represented by the TC-RNTI is referred to as a reused bit. For example, a value of the reused bit is first determined based on the TA value that needs to be indicated by the TA instruction, and further, a value of a remaining bit in the 16 bits is determined based on the value indicated by the TC-RNTI instruction.

In this embodiment of this application, the bit of the TA instruction is extended by using the reserved bit, for example, the reserved bit in the BI, the reserved bit in the UL-grant, or the reserved bit in the RAR, or by using the bit implicitly provided by the TC-RNTI. In this way, the TA instruction can indicate a TA value in a larger range, so that the requirement of the NTN system is met. In addition, the range of the TA value indicated by the TA instruction can be further increased by combining the reserved bit and the bit implicitly provided by the TC-RNTI.

In another possible scenario, the cell diameter of the cell in which the terminal is located is less than or equal to 600 kilometers, and a minimum elevation angle of the terminal is 10 degrees. When the subcarrier spacing is 15 kHz, 30 kHz, 60 kHz, 120 kHz, or 240 kHz, to meet a requirement that a maximum value represented by $N_{TA}$ is 4 milliseconds, the quantity of bits that need to be added is 1, 2, 3, 4, or 5 respectively. Further, based on the quantity of bits that need to be added, a bit to be used as the extended bit is determined from the candidate bit pool shown in Table 3. A correspondence between a subcarrier spacing and an extended bit is specifically shown in Table 7 below. In other words, the terminal and the network device may agree, in advance, on the correspondence shown in Table 7. It can be understood that the method described in this embodiment of this application may be further applied to a terminal in an area in which a satellite beam is used as a unit. For example, the terminal is located in an area in which a beam diameter is less than or equal to 600 kilometers.

TABLE 7

| Subcarrier spacing | $N_{TA}$ represents a maximum of 4 milliseconds Quantity of bits that need to be added to the TA instruction | Extended bit |
|---|---|---|
| 15 kHz | 1 | One bit reserved in a RAR |
| 30 kHz | 2 | One bit reserved in a RAR<br>One bit reserved in a BI |
| 60 kHz | 3 | One bit reserved in a RAR<br>Two bits reserved in a BI |
| 120 kHz | 4 | One bit reserved in a RAR<br>Two bits reserved in a BI<br>One bit reserved in a UL-grant |
| 240 kHz | 5 | One bit reserved in a RAR<br>Two bits reserved in a BI<br>One bit reserved in a UL-grant<br>One bit implicitly represented by a TC-RNTI |

The correspondence between a subcarrier spacing and an extended bit shown in Table 7 is merely an example for description, and does not constitute a specific limitation. In another embodiment, alternatively, there may be another correspondence. A process in which the network device determines the extended bit of the TA instruction based on the subcarrier spacing of the terminal and Table 7 and sends the TA instruction to the terminal, and a process in which the terminal determines the extended bit of the TA instruction based on the subcarrier spacing and Table 7 are both the same as those described above. Details are not described herein again. In addition, a manner of reusing the one bit implicitly represented by the TC-RNTI is also described above, and details are not described herein again.

In still another possible scenario, the cell diameter of the cell in which the terminal is located is less than or equal to 1200 kilometers, and a minimum elevation angle of the terminal is 10 degrees. When the subcarrier spacing is 15 kHz, 30 kHz, 60 kHz, 120 kHz, or 240 kHz, to meet a requirement that a maximum value represented by $N_{TA}$ is 8 milliseconds, the quantity of bits that need to be added is 2, 3, 4, 5, or 6 respectively. Further, based on the quantity of bits that need to be added, a bit to be used as the extended bit is determined from the candidate bit pool shown in Table 3. A correspondence between a subcarrier spacing and an extended bit is specifically shown in Table 8 below. In other words, the terminal and the network device may agree, in advance, on the correspondence shown in Table 8. It can be understood that the method described in this embodiment of this application may be further applied to a terminal in an area in which a satellite beam is used as a unit. For example, the terminal is located in an area in which a beam diameter is less than or equal to 1200 kilometers.

TABLE 8

| Subcarrier spacing | $N_{TA}$ represents a maximum of 8 milliseconds Quantity of bits that need to be added to the TA instruction | Extended bit |
|---|---|---|
| 15 kHz | 2 | One bit reserved in a RAR<br>One bit reserved in a BI |
| 30 kHz | 3 | One bit reserved in a RAR<br>Two bits reserved in a BI |
| 60 kHz | 4 | One bit reserved in a RAR<br>Two bits reserved in a BI<br>One bit reserved in a UL-grant |
| 120 kHz | 5 | One bit reserved in a RAR<br>Two bits reserved in a BI<br>One bit reserved in a UL-grant<br>One bit implicitly represented by a TC-RNTI |
| 240 kHz | 6 | One bit reserved in a RAR<br>Two bits reserved in a BI<br>One bit reserved in a UL-grant<br>One bit implicitly represented by a TC-RNTI<br>One bit represented by whether a slot number corresponding to a RAR is an odd number or an even number |

The correspondence between a subcarrier spacing and an extended bit shown in Table 8 is merely an example for description, and does not constitute a specific limitation. In another embodiment, alternatively, there may be another correspondence. For example, when the subcarrier spacing is 240 kHz, one bit reserved in the RAR, two bits reserved in the BI, one bit reserved in the UL-grant, and two bits implicitly represented by the TC-RNTI may be alternatively selected to extend the TA instruction. A process in which the network device determines the extended bit of the TA instruction based on the subcarrier spacing of the terminal and Table 8 and sends the TA instruction to the terminal, and a process in which the terminal determines the extended bit of the TA instruction based on the subcarrier spacing and Table 8 are both the same as those described above. Details are not described herein again. In addition, a manner of reusing the one bit implicitly represented by the TC-RNTI is also described above, and details are not described herein again.

It can be understood that, the cell diameter is usually within a preset range, for example, 100 kilometers to 1500 kilometers. The foregoing scenarios in which the cell diameter is less than or equal to 300 kilometers, 600 kilometers, and 1200 kilometers are merely examples for description, and do not limit the cell diameter.

In addition, it can be understood that a location of the extended bit in a plurality of bits occupied by the entire TA instruction is not limited in this embodiment of this application. For example, the extended bit may be used as a low-order bit, a high-order bit, or an intermediate bit. Alternatively, some of the extended bits are used as low-order bits, and the rest of the extended bits are used as a high-order bit or an intermediate bit.

Figure 11:
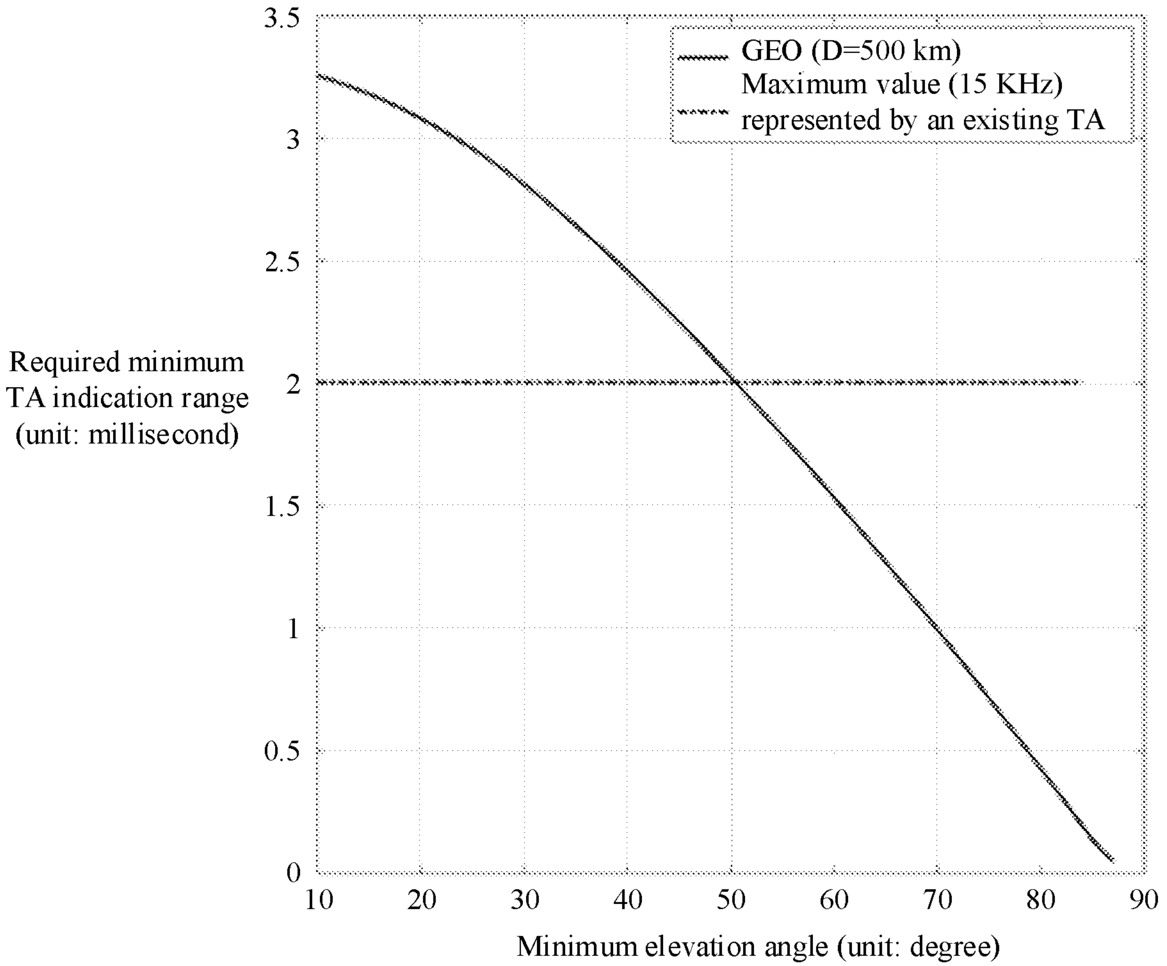
FIG. 11 is a schematic diagram of a relationship between a minimum elevation angle of a terminal and a required minimum TA indication range according to an embodiment of this application.

The one or more bits implicitly represented by the TC-RNTI is used as an example below to describe a location, in the plurality of bits occupied by the entire TA instruction, of the one or more bits implicitly represented by the TC-RNTI. In a scenario in which the cell diameter is 500 kilometers in a GEO system and the subcarrier spacing is 15 kHz, FIG. 11 shows a relationship between a minimum elevation angle of the terminal and a required minimum TA indication range. It can be seen from the figure that, in a cell in which the minimum elevation angle of the terminal is less than 50 degrees, a range in which a TA is greater than 2 milliseconds needs to be used. Therefore, if the one or more bits implicitly represented by the TC-RNTI are used as a high-order bit of the TA instruction, the one or more bits implicitly represented by the TC-RNTI may not be used for a cell in which the minimum elevation angle of the terminal is greater than 50 degrees; and if the one or more bits implicitly represented by the TC-RNTI are used as a low-order bit of the TA instruction, the one or more bits implicitly represented by the TC-RNTI may be used for both the cell in which the minimum elevation angle of the terminal is greater than 50 degrees and the cell in which the minimum elevation angle of the terminal is less than 50 degrees. Therefore, based on the foregoing embodiment, the one or more bits implicitly represented by the TC-RNTI may be used as a low-order bit of the TA instruction, so that the terminal and the network device in different scenarios can use the one or more bits implicitly represented by the TC-RNTI. In this way, resource utilization is improved.

It can be understood that the network device may provide a service for a terminal in one cell, or may provide a service for terminals in a plurality of cells. When the network device provides a service for a terminal in one fixed cell, the network device may determine, based on a cell diameter, a correspondence between a subcarrier spacing and an extended bit, for example, the correspondence shown in Table 5 to Table 8, and further determine, based on a subcarrier spacing of the terminal in the cell, a bit that needs to be extended. In some scenarios, the network device may alternatively provide a service for terminals in a plurality of different cells. In this case, the network device needs to determine the extended bit of the TA instruction based on a subcarrier spacing of the terminal and a diameter of a cell to which the terminal belongs. In this case, the network device and the terminal may establish or store a correspondence shown in Table 9 below.

TABLE 9

| | D ≤ 300 kilometers | | D ≤ 600 kilometers | | D ≤ 1200 kilometers | |
|---|---|---|---|---|---|---|
| Subcarrier spacing | Quantity of added bits | Extended bit | Quantity of added bits | Extended bit | Quantity of added bits | Extended bit |
| 15 kHz | N/A | | 1 | One bit reserved in a RAR | 2 | One bit reserved in a RAR<br>One bit reserved in a BI |
| 30 kHz | 1 | One bit reserved in a BI | 2 | One bit reserved in a RAR<br>One bit reserved in a BI | 3 | One bit reserved in a RAR<br>Two bits reserved in a BI |
| 60 kHz | 2 | Two bits reserved in a BI | 3 | One bit reserved in a RAR<br>Two bits reserved in a BI | 4 | One bit reserved in a RAR<br>Two bits reserved in a BI<br>One bit reserved in a UL-grant |
| 120 kHz | 3 | Two bits reserved in a BI<br>One bit reserved in a UL-grant | 4 | One bit reserved in a RAR<br>Two bits reserved in a BI<br>One bit reserved in a UL-grant | 5 | One bit reserved in a RAR<br>Two bits reserved in a BI<br>One bit reserved in a UL-grant<br>One bit implicitly represented by a TC-RNTI |
| 240 kHz | 4 | Two bits reserved in a BI<br>One bit reserved in a UL-grant<br>One bit implicitly represented by a TC-RNTI | 5 | One bit reserved in a RAR<br>Two bits reserved in a BI<br>One bit reserved in a UL-grant<br>One bit implicitly represented by a TC-RNTI | 6 | One bit reserved in a RAR<br>Two bits reserved in a BI<br>One bit reserved in a UL-grant<br>One bit implicitly represented by a TC-RNTI<br>One bit represented by whether a slot number corresponding to a RAR is an odd number or an even number |

In Table 9, D represents a cell diameter or a beam diameter. In other words, the method described in this embodiment of this application is not only applicable to a cell-level area, but also applicable to a beam-level area.

Specifically, a process in which the network device determines the extended bits of the TA instruction based on the subcarrier spacing of the terminal, the cell diameter, and Table 9 and sends the TA instruction to the terminal, and a process in which the terminal determines the extended bits of the TA instruction based on the subcarrier spacing, the cell diameter, and Table 9 are both the same as those described above. Details are not described herein again.

It can be understood that, to reduce a data storage amount of a terminal, a terminal whose cell diameter is less than or equal to 300 kilometers may store the correspondence shown in Table 5 or Table 6, a terminal whose cell diameter is less than or equal to 600 kilometers may store the correspondence shown in Table 7, and a terminal whose cell diameter is less than or equal to 1200 kilometers may store the correspondence shown in Table 8.

It can be learned from the foregoing embodiment that, through bit extension of the TA instruction, the range of the TA value indicated by the TA instruction can be effectively increased, to meet the requirement of the NTN system. However, in some scenarios, it is possible that the bit of the TA instruction cannot be extended. For example, the candidate bit pool shown in Table 3 may have been used. In this case, a method described in the following embodiment may be alternatively used to meet the requirement of the NTN system.

Figure 12:
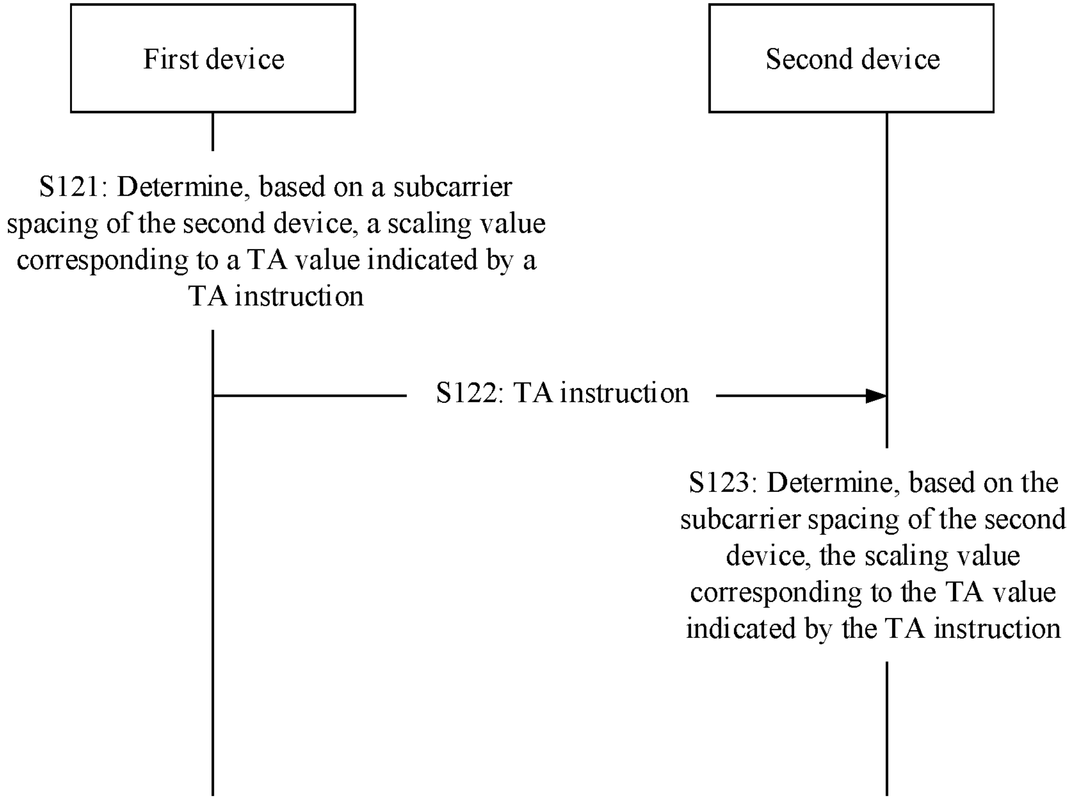
FIG. 12 is a flowchart of a timing advance indication method according to an embodiment of this application.

FIG. 12 is a flowchart of a timing advance indication method according to an embodiment of this application. As shown in FIG. 12, the timing advance indication method in this embodiment includes the following steps.

S121: A first device determines, based on a subcarrier spacing of a second device, a scaling value corresponding to a TA value indicated by a TA instruction.

In this embodiment, the first device may be a network device, and the second device may be a terminal. When the network device needs to send the TA instruction to the terminal, the network device determines whether a TA value indicated by an existing 12-bit TA instruction can meet a requirement of an NTN system. If the TA value cannot meet the requirement, the network device determines, based on the subcarrier spacing of the terminal, the scaling value corresponding to the TA value indicated by the TA instruction. The scaling value is used to adjust a range of the TA value indicated by the TA instruction.

For example, a maximum represented value of the TA value indicated by the 12-bit TA instruction is 3846, and it may be learned through calculation based on the TA value that a maximum value of a TA time adjustment value $N_{TA}$ is approximately 2 milliseconds. If the current NTN system requires that a maximum value that can be represented by $N_{TA}$ be 4 milliseconds, the subcarrier spacing of the terminal is 15 kHz, and a diameter of a cell to which the terminal belongs is less than or equal to 600 kilometers, it can be learned based on the foregoing embodiment that one bit needs to be added to the TA instruction. A maximum value that can be represented by a TA value of 13 bits is twice a maximum value that can be represented by a 12-bit TA value; in other words, the TA value indicated by the TA instruction needs to be increased to twice the original value. Herein, a factor by which the TA value needs to be increased may be referred to as the scaling value, and the scaling value is also referred to as a scale factor S. As shown in Table 10 below, when a cell diameter is less than or equal to 600 kilometers and a minimum elevation angle of the terminal is 10 degrees, to meet the requirement of the NTN system, scale factors S respectively corresponding to subcarrier spacings 15 kHz, 30 kHz, 60 kHz, 120 kHz, and 240 kHz are 2, 4, 8, 16, and 32. The scale factor S is determined based on a multiple by which the TA value indicated by the TA instruction needs to be increased. It can be understood that, for other different scenarios, for example, a scenario in which a cell diameter is less than or equal to 300 kilometers or 1200 kilometers, a correspondence similar to that in Table 10 exists correspondingly, and details are not described herein. It can be understood that the method described in this embodiment of this application may be further applied to a terminal in an area in which a satellite beam is used as a unit. For example, the terminal is located in an area in which a beam diameter is less than or equal to 600 kilometers.

TABLE 10

| Subcarrier spacing | Multiple by which the TA value needs to be increased | Scale factor S |
|---|---|---|
| 15 kHz | 2 | 2 |
| 30 kHz | 4 | 4 |
| 60 kHz | 8 | 8 |
| 120 kHz | 16 | 16 |
| 240 kHz | 32 | 32 |

S122: The first device sends the TA instruction to the second device.

The TA instruction herein may be specifically the 12-bit TA instruction shown in FIG. 6.

S123: The second device determines, based on the subcarrier spacing of the second device, the scaling value corresponding to the TA value indicated by the TA instruction.

Specifically, in a scenario in which a cell diameter is less than or equal to 600 kilometers and a minimum elevation angle of the terminal is 10 degrees, the network device and the terminal may agree, in advance, on the correspondence shown in Table 10.

After receiving the TA instruction, the terminal may determine, based on the subcarrier spacing 15 kHz of the terminal and the correspondence in Table 10, the scaling value corresponding to the TA value indicated by the TA instruction, for example, the scale factor S=2, and further, calculate a TA time adjustment value $N_{TA}$ based on the TA value indicated by the TA instruction and the scale factor S. $N_{TA}=S\cdot T_A\cdot 16\cdot 64/2^{\mu}\cdot T_c$, where $T_A$ represents the TA value indicated by the TA instruction. A meaning of $\mu$ is the same as that in the foregoing embodiment, a value of $T_c$ is the same as that in the foregoing embodiment, and a definition of the subcarrier spacing is also the same as that in the foregoing embodiment. Details are not described herein again. $N_{TA}$ may be used as a reference value of a timing advance used by the terminal to send uplink data to the network device subsequently.

It can be understood that the correspondence between a subcarrier spacing and a scale factor in Table 10 is merely an example for description, and does not constitute a specific limitation. The scale factor is not limited to the several integers, and may be set to any rational number. A focus is on the correspondence between a subcarrier spacing and a scale factor. For example, in a scenario in which a cell diameter or a beam diameter is less than or equal to 600 kilometers and a minimum elevation angle of the terminal is 10 degrees, a correspondence between a subcarrier spacing and a scale factor may alternatively be a correspondence shown in Table 11 below.

TABLE 11

| Subcarrier spacing | Multiple by which the TA value needs to be increased | Scale factor S |
|---|---|---|
| 15 kHz | 2 | 1 |
| 30 kHz | 4 | 2 |
| 60 kHz | 8 | 3 |
| 120 kHz | 16 | 4 |
| 240 kHz | 32 | 5 |

For example, after receiving the TA instruction, the terminal may determine, based on the subcarrier spacing 15 kHz of the terminal and the correspondence in Table 11, the scaling value corresponding to the TA value indicated by the TA instruction, for example, the scale factor S=1, and further, calculate a TA time adjustment value $N_{TA}$ based on the TA value indicated by the TA instruction and the scale factor S. $N_{TA}=2^{S}\cdot T_A\cdot 16\cdot 64/2^{\mu}\cdot T_c$.

In addition, when the network device provides a service for terminals in a plurality of cells, if a cell diameter of each cell is different, the network device may further determine, based on the subcarrier spacing of the terminal and a diameter of a cell to which the terminal belongs, the scaling value corresponding to the TA value indicated by the TA instruction sent to the terminal. In this case, for a correspondence between a subcarrier spacing, a cell diameter, and a scaling value, namely, a scale factor, refer to a correspondence in Table 12 below. Details about a process in which the network device determines the scale factor based on Table 12 and sends the TA instruction, and the terminal determines the scale factor based on the subcarrier spacing are not described herein.

TABLE 12

| | D ≤ 300 kilometers | | D ≤ 600 kilometers | | D ≤ 1200 kilometers | |
|---|---|---|---|---|---|---|
| Subcarrier spacing | Multiple by which the TA value needs to be increased | Scale factor S | Multiple by which the TA value needs to be increased | Scale factor S | Multiple by which the TA value needs to be increased | Scale factor S |
| 15 kHz | N/A | N/A | 2 | 2 | 4 | 4 |
| 30 kHz | 2 | 2 | 4 | 4 | 8 | 8 |
| 60 kHz | 4 | 4 | 8 | 8 | 16 | 16 |
| 120 kHz | 8 | 8 | 16 | 16 | 32 | 32 |
| 240 kHz | 16 | 16 | 32 | 32 | 64 | 64 |

N/A indicates that the requirement of the NTN system can be met without increasing the TA value by a multiple. D in Table 12 represents a cell diameter or a beam diameter. In other words, the method described in this embodiment of this application is not only applicable to a cell-level area, but also applicable to a beam-level area.

In this embodiment, the scaling value corresponding to the TA value indicated by the TA instruction is determined by using the subcarrier spacing. Because the scaling value can be used to adjust a range of the TA value indicated by the TA instruction, a TA value capable of indicating a larger range can be determined based on the TA value indicated by the TA instruction and the scaling value, so that the requirement of the NTN system can be met.

Based on the foregoing embodiment, the network device may further send indication information to the terminal, where the indication information is used to indicate whether the TA value corresponds to a scaling value. The indication information includes at least one of the following: a reserved bit in a random access response RAR, a reserved bit in a backoff indicator BI, a reserved bit in an uplink grant UL-grant, at least one bit corresponding to a temporary cell radio network temporary identifier TC-RNTI, or one bit represented by whether a slot number corresponding to the RAR is an odd number or an even number. In other words, the indication information may be represented by using one bit in the candidate bit pool shown in Table 3 above. For example, the one bit reserved in the RAR, that is, the 1-bit reserved bit shown in FIG. 6, is used as an example for description. When the bit is 1, it indicates that the TA value indicated by the TA instruction corresponds to a scaling value; in other words, the scale factor needs to be used during calculation of the TA time adjustment value $N_{TA}$. When the bit is 0, it indicates that the TA value indicated by the TA instruction has no corresponding scaling value; in other words, the scale factor does not need to be used during calculation of the TA time adjustment value $N_{TA}$. In this way, flexibility of the scale factor can be improved.

It can be understood that some or all of the steps or operations in the foregoing embodiments are merely examples. Other operations or variations of various operations may be further performed in the embodiments of this application. In addition, the steps may be performed in a sequence different from that presented in the foregoing embodiments, and it is possible that not all of the operations in the foregoing embodiments need to be performed.

It can be understood that, in the foregoing embodiments, operations or steps implemented by the terminal may be alternatively implemented by a component (for example, a chip or a circuit) that can be used for the terminal, and operations or steps implemented by the network device may be alternatively implemented by a component (for example, a chip or a circuit) that can be used for the network device.

Figure 13:
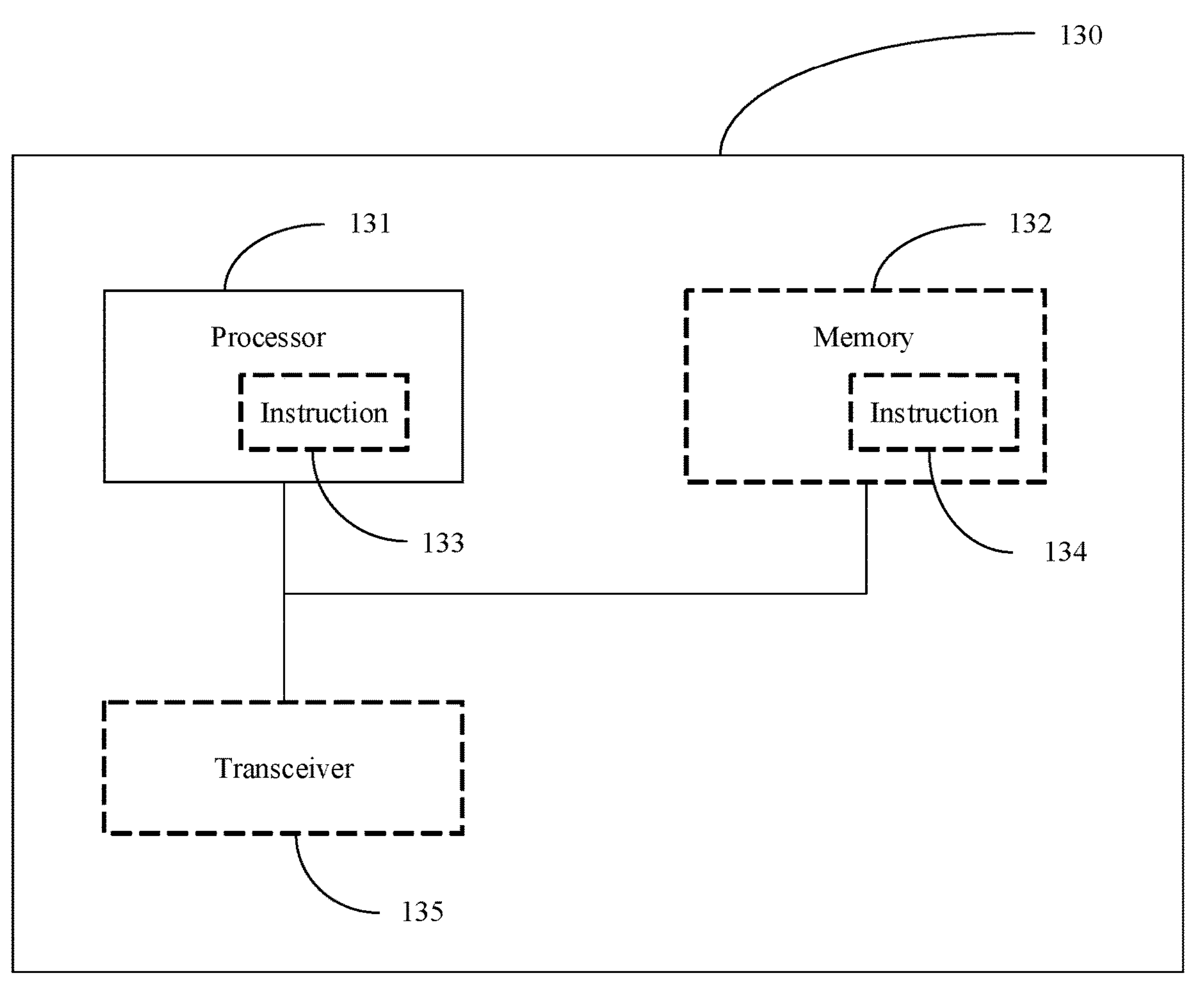
FIG. 13 is a schematic diagram of a structure of a communication apparatus according to an embodiment of this application.

FIG. 13 is a schematic diagram of a structure of a communication apparatus. The communication apparatus may be configured to implement a method part corresponding to the network device (for example, the first device) or a method part corresponding to the terminal (for example, the second device) described in the foregoing method embodiments. For details, refer to the descriptions in the foregoing method embodiments.

The communication apparatus 130 may include one or more processors 131. The processor 131 may also be referred to as a processing unit, and may implement a specific control function. The processor 131 may be a general-purpose processor, a special-purpose processor, or the like.

In an optional design, the processor 131 may also store an instruction 133. The instruction may be run by the processor, to enable the communication apparatus 130 to perform the method corresponding to the terminal or the network device, described in the foregoing method embodiments.

In another possible design, the communication apparatus 130 may include a circuit, and the circuit may implement a sending, receiving, or communication function in the foregoing method embodiments.

Optionally, the communication apparatus 130 may include one or more memories 132. The memory stores an instruction 134 or intermediate data. The instruction 134 may be run by the processor, to enable the communication apparatus 130 to perform the method described in the foregoing embodiments. Optionally, the memory may further store other related data. Optionally, the processor may also store an instruction and/or data. The processor and the memory may be separately disposed, or may be integrated together.

Optionally, the communication apparatus 130 may further include a transceiver 135.

The processor 131 may be referred to as a processing unit. The transceiver 135 may be referred to as a transceiver unit, a transceiver, a transceiver circuit, a transceiver, or the like, and is configured to implement a transceiver function of the communication apparatus.

If the communication apparatus is configured to implement operations corresponding to the first device in the embodiment shown in FIG. 8, for example, the transceiver may send a TA instruction to the second device. The transceiver may further complete another corresponding communication function. The processor is configured to complete a corresponding determining or control operation, and optionally, may further store a corresponding instruction in the memory. For a specific processing manner of each component, refer to related descriptions in the foregoing embodiments.

If the communication apparatus is configured to implement operations corresponding to the second network device in FIG. 8, for example, the transceiver may receive a TA instruction sent by the first device. The transceiver may further complete another corresponding communication function. The processor is configured to complete a corresponding determining or control operation, and optionally, may further store a corresponding instruction in the memory. For a specific processing manner of each component, refer to related descriptions in the foregoing embodiments.

The processor and the transceiver described in this application may be implemented on an integrated circuit (integrated circuit, IC), an analog IC, a radio frequency integrated circuit RFIC, a mixed-signal IC, an application-specific integrated circuit (application specific integrated circuit, ASIC), a printed circuit board (printed circuit board, PCB), an electronic device, or the like. The processor and the transceiver may also be manufactured by using various IC technologies, for example, a complementary metal-oxide-semiconductor (complementary metal oxide semiconductor, CMOS), an N-metal-oxide-semiconductor (N-Metal-oxide-semiconductor, NMOS), a positive channel metal oxide semiconductor (positive channel metal oxide semiconductor, PMOS), a bipolar junction transistor (Bipolar Junction Transistor, BJT), a bipolar CMOS (BiCMOS), silicon germanium (SiGe), and gallium arsenide (GaAs).

Optionally, the communication apparatus may be an independent device, or may be a part of a larger device. For example, the device may be:

(1) an independent integrated circuit IC, a chip, or a chip system or subsystem;
(2) a set having one or more ICs, where optionally, the IC set may also include a storage component configured to store data and/or instructions;
(3) an ASIC, for example, a modem (MSM);
(4) a module that can be embedded in another device;
(5) a receiver, a terminal, a cellular phone, a wireless device, a handheld phone, a mobile unit, a network device, or the like; or
(6) others or the like.

Figure 14:
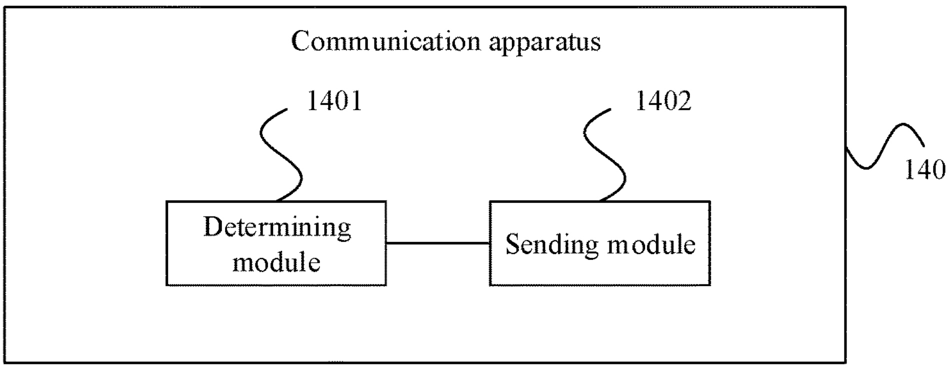
FIG. 14 is a schematic diagram of a structure of a communication apparatus according to an embodiment of this application.

FIG. 14 is a schematic diagram of a structure of a communication apparatus according to an embodiment of this application. As shown in FIG. 14, the communication apparatus 140 includes a determining module 1401 and a sending module 1402. The determining module 1401 is configured to determine a quantity of extended bits and a location of the extended bit of a timing advance TA instruction based on a subcarrier spacing of a second device. The sending module 1402 is configured to send the TA instruction to the second device, where the TA instruction includes the extended bit, the TA instruction is used to indicate a round-trip transmission delay or a round-trip transmission delay difference between the first device and the second device, and a quantity of bits of the TA instruction is greater than 12.

In FIG. 14, further, when determining the quantity of extended bits and the location of the extended bit of the timing advance TA instruction based on the subcarrier spacing of the second device, the determining module 1401 is specifically configured to determine the quantity of extended bits and the location of the extended bit of the TA instruction based on the subcarrier spacing of the second device and a size of a cell to which the second device belongs.

Optionally, the quantity of extended bits and the location of the extended bit include at least one of the following: one bit reserved in a random access response RAR, two bits reserved in a backoff indicator BI, one bit reserved in an uplink grant UL-grant, at least one bit reused in a temporary cell radio network temporary identifier TC-RNTI, or one bit represented by whether a slot number corresponding to the RAR is an odd number or an even number.

Optionally, the at least one bit corresponding to the TC-RNTI is a low-order bit of a TA value indicated by the TA instruction.

The communication apparatus in the embodiment shown in FIG. 14 may be configured to perform the technical solutions in the foregoing method embodiments. For an implementation principle and a technical effect of the communication apparatus, further refer to related descriptions in the method embodiments. Optionally, the communication apparatus may be a network device, or may be a component (for example, a chip or a circuit) of the network device.

Figure 15:
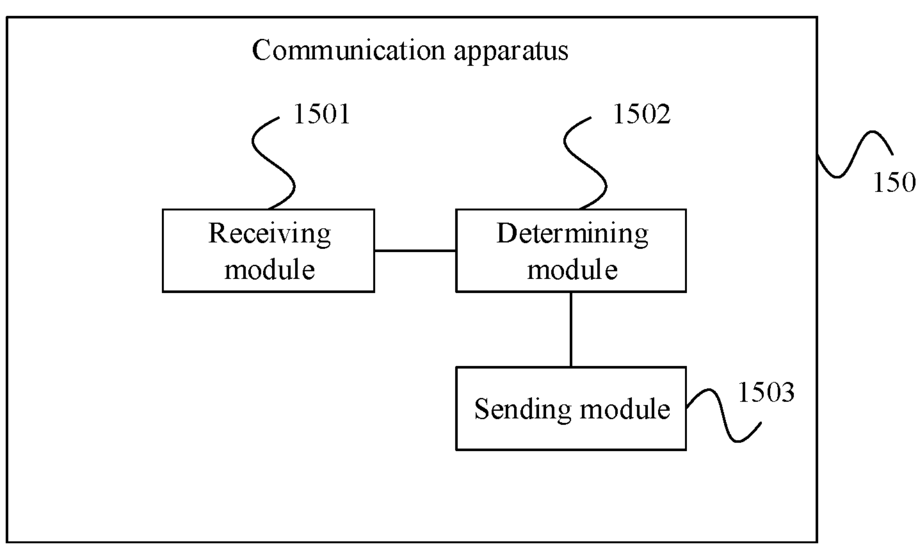
FIG. 15 is a schematic diagram of a structure of another communication apparatus according to an embodiment of this application.

FIG. 15 is a schematic diagram of a structure of another communication apparatus according to an embodiment of this application. As shown in FIG. 15, the communication apparatus 150 includes a receiving module 1501 and a determining module 1502. The receiving module 1501 is configured to receive a TA instruction from a first device, where the TA instruction includes an extended bit, the TA instruction is used to indicate a round-trip transmission delay or a round-trip transmission delay difference between the first device and the second device, and a quantity of bits of the TA instruction is greater than 12. The determining module 1502 is configured to determine a quantity of extended bits and a location of the extended bit of the TA instruction based on a subcarrier spacing of the second device.

In FIG. 15, further, the communication apparatus 150 further includes a sending module 1503. The sending module 1503 is configured to: after the determining module 1502 determines the quantity of extended bits and the location of the extended bit of the TA instruction based on the subcarrier spacing of the second device, send data to the first device based on a TA value indicated by the TA instruction.

Optionally, when determining the quantity of extended bits and the location of the extended bit of the TA instruction based on the subcarrier spacing of the second device, the determining module 1502 is specifically configured to determine the quantity of extended bits and the location of the extended bit of the TA instruction based on the subcarrier spacing of the second device and a size of a cell to which the second device belongs.

Optionally, the quantity of extended bits and the location of the extended bit include at least one of the following: one bit reserved in a random access response RAR, two bits reserved in a backoff indicator BI, one bit reserved in an uplink grant UL-grant, at least one bit reused in a temporary cell radio network temporary identifier TC-RNTI, or one bit represented by whether a slot number corresponding to the RAR is an odd number or an even number.

Optionally, the at least one bit corresponding to the TC-RNTI is a low-order bit of the TA value indicated by the TA instruction.

The communication apparatus in the embodiment shown in FIG. 15 may be configured to perform the technical solutions in the foregoing method embodiments. For an implementation principle and a technical effect of the communication apparatus, further refer to related descriptions in the method embodiments. Optionally, the communication apparatus may be a terminal, or may be a component (for example, a chip or a circuit) of the terminal.

Figure 16:
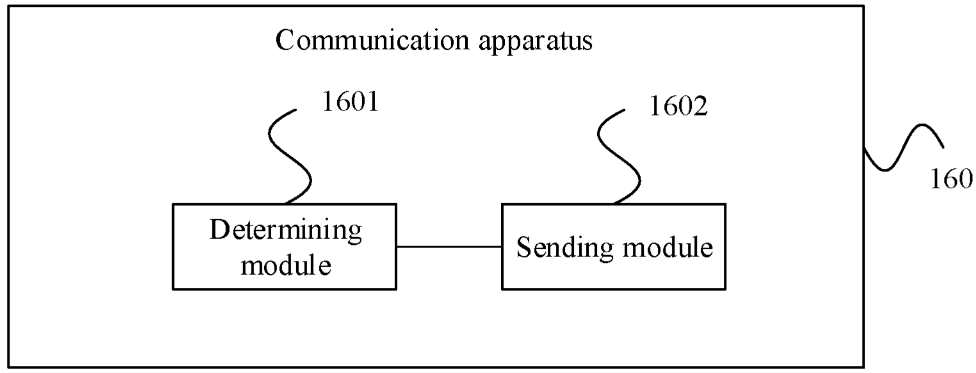
FIG. 16 is a schematic diagram of a structure of another communication apparatus according to an embodiment of this application.

FIG. 16 is a schematic diagram of a structure of another communication apparatus according to an embodiment of this application. As shown in FIG. 16, the communication apparatus 160 includes a determining module 1601 and a sending module 1602. The determining module 1601 is configured to determine, based on a subcarrier spacing of a second device, a scaling value corresponding to a TA value indicated by a TA instruction. The sending module 1602 is configured to send the TA instruction to the second device. The scaling value is used to adjust a range of the TA value indicated by the TA instruction.

In FIG. 16, further, when determining, based on the subcarrier spacing of the second device, the scaling value corresponding to the TA value indicated by the TA instruction, the determining module 1601 is specifically configured to determine, based on the subcarrier spacing of the second device and a size of a cell to which the second device belongs, the scaling value corresponding to the TA value indicated by the TA instruction.

Optionally, the sending module 1602 is further configured to send indication information to the second device, where the indication information is used to indicate whether the TA value corresponds to a scaling value.

Optionally, the indication information includes at least one of the following: a reserved bit in a random access response RAR, a reserved bit in a backoff indicator BI, a reserved bit in an uplink grant UL-grant, at least one bit corresponding to a temporary cell radio network temporary identifier TC-RNTI, or one bit represented by whether a slot number corresponding to the RAR is an odd number or an even number.

The communication apparatus in the embodiment shown in FIG. 16 may be configured to perform the technical solutions in the foregoing method embodiments. For an implementation principle and a technical effect of the communication apparatus, further refer to related descriptions in the method embodiments. Details are not described herein again. Optionally, the communication apparatus may be a network device, or may be a component (for example, a chip or a circuit) of the network device.

Figure 17:
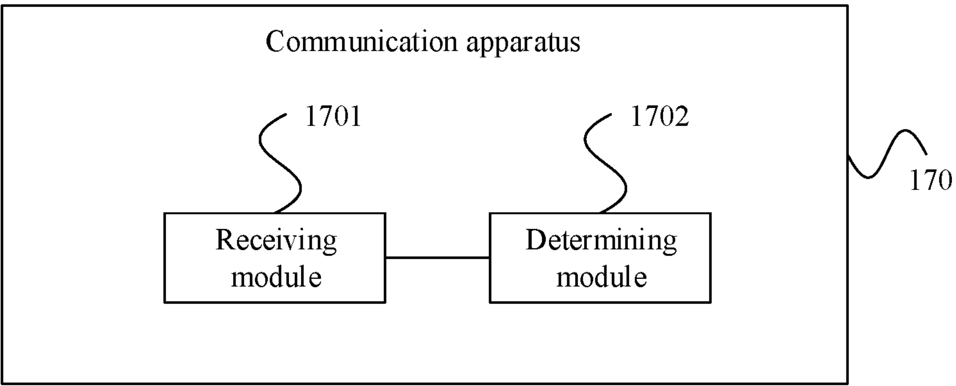
FIG. 17 is a schematic diagram of a structure of another communication apparatus according to an embodiment of this application.

FIG. 17 is a schematic diagram of a structure of another communication apparatus according to an embodiment of this application. As shown in FIG. 17, the communication apparatus 170 includes a receiving module 1701 and a determining module 1702. The receiving module 1701 is configured to receive a TA instruction sent by a first device. The determining module 1702 is configured to determine, based on a subcarrier spacing of the second device, a scaling value corresponding to a TA value indicated by the TA instruction. The scaling value is used to adjust a range of the TA value indicated by the TA instruction.

In FIG. 17, further, after determining, based on the subcarrier spacing of the second device, the scaling value corresponding to the TA value indicated by the TA instruction, the determining module 1702 is further configured to determine, based on the TA value indicated by the TA instruction and the scaling value, a TA value used by the second device when sending data to the first device.

Optionally, when determining, based on the subcarrier spacing of the second device, the scaling value corresponding to the TA value indicated by the TA instruction, the determining module 1702 is specifically configured to determine, based on the subcarrier spacing of the second device and a size of a cell to which the second device belongs, the scaling value corresponding to the TA value indicated by the TA instruction.

Optionally, the receiving module 1701 is further configured to receive indication information from the first device, where the indication information is used to indicate whether the TA value corresponds to a scaling value.

Optionally, the indication information includes at least one of the following: a reserved bit in a random access response RAR, a reserved bit in a backoff indicator BI, a reserved bit in an uplink grant UL-grant, at least one bit corresponding to a temporary cell radio network temporary identifier TC-RNTI, or one bit represented by whether a slot number corresponding to the RAR is an odd number or an even number.

The communication apparatus in the embodiment shown in FIG. 17 may be configured to perform the technical solutions in the foregoing method embodiments. An implementation principle and a technical effect of the communication apparatus are similar to those in the method embodiments, and details are not described herein again. The communication apparatus may be a terminal, or may be a component (for example, a chip or a circuit) of the terminal.

It should be understood that division into the foregoing modules of each of the communication apparatuses shown in FIG. 14 to FIG. 17 is merely logical function division. During actual implementation, all or some of the modules may be integrated into one physical entity, or may be physically separate. In addition, all of the modules may be implemented in a form of software invoked by a processing element, or may be implemented in a form of hardware. Alternatively, some of the modules may be implemented in a form of software invoked by a processing element, and some of the modules may be implemented in a form of hardware. For example, the determining module may be an independently disposed processing element, or may be integrated into the communication apparatus, for example, into a chip of the network device or the terminal for implementation. In addition, the determining module may be alternatively stored in a memory of the communication apparatus in a form of a program, and a processing element of the communication apparatus invokes and performs a function of each of the foregoing modules. Implementations of the other modules are similar thereto. In addition, all or some of the modules may be integrated together, or may be implemented independently. The processing element herein may be an integrated circuit and has a signal processing capability. In an implementation process, steps of the foregoing methods or the foregoing modules can be implemented by using a hardware integrated logic circuit in the processing element, or by using instructions in a form of software.

For example, the foregoing modules may be configured as one or more integrated circuits for implementing the foregoing method, for example, one or more application-specific integrated circuits (Application Specific Integrated Circuits, ASICs), one or more microprocessors (digital signal processors, DSPs), or one or more field programmable gate arrays (Field Programmable Gate Arrays, FPGAs). For another example, when one of the foregoing modules is implemented in a form of a program scheduled by a processing element, the processing element may be a general-purpose processor, for example, a central processing unit (Central Processing Unit, CPU) or another processor that can invoke the program. For another example, these modules may be integrated together, and implemented in a form of a system-on-a-chip (system-on-a-chip, SOC).

Figure 18:
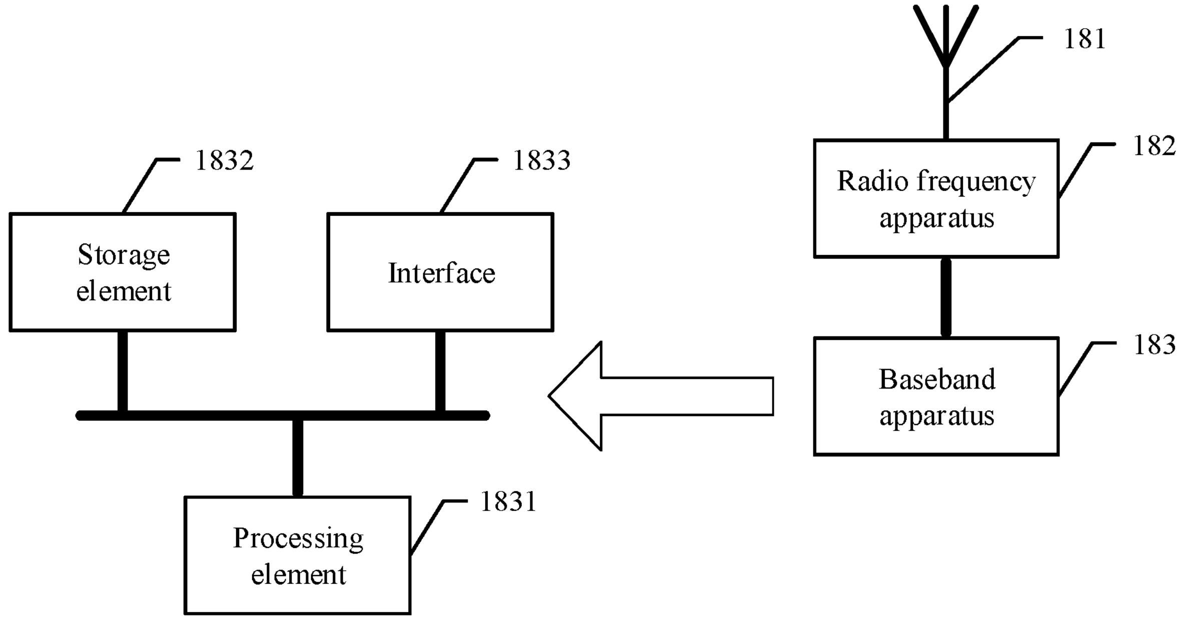
FIG. 18 is a schematic diagram of a structure of still another communication apparatus according to an embodiment of this application.

FIG. 18 is a schematic diagram of a structure of still another communication apparatus according to an embodiment of this application. The communication apparatus may be specifically a network device, for example, a base station. As shown in FIG. 18, the base station includes an antenna 181, a radio frequency apparatus 182, and a baseband apparatus 183. The antenna 181 is connected to the radio frequency apparatus 182. In an uplink direction, the radio frequency apparatus 182 receives, by using the antenna 181, information sent by a terminal, and sends, to the baseband apparatus 183 for processing, the information sent by the terminal. In a downlink direction, the baseband apparatus 183 processes the information from the terminal, and sends the processed information to the radio frequency apparatus 182; and the radio frequency apparatus 182 processes the information from the terminal, and then sends the processed information to the terminal by using the antenna 181.

The foregoing communication apparatus may be located at the baseband apparatus 183. In an implementation, the foregoing modules are implemented in a form of a program scheduled by a processing element. For example, the baseband apparatus 183 includes a processing element and a storage element, and the processing element 1831 invokes a program stored in the storage element 1832, to perform the method in the foregoing method embodiments. In addition, the baseband apparatus 183 may further include an interface 1833, configured to exchange information with the radio frequency apparatus 182. The interface is, for example, a common public radio interface (common public radio interface, CPRI).

In another implementation, the foregoing modules may be configured as one or more processing elements for implementing the foregoing method, and the processing element is disposed on the baseband apparatus 183. The processing element herein may be an integrated circuit, for example, one or more ASICs, one or more DSPs, or one or more FPGAs. These integrated circuits may be integrated together to form a chip.

For example, the foregoing modules may be integrated together, and implemented in a form of a system-on-a-chip (system-on-a-chip, SOC). For example, the baseband apparatus 183 includes an SOC chip, configured to implement the foregoing method. The processing element 1831 and the storage element 1832 may be integrated into the chip, and the processing element 1831 invokes the program stored in the storage element 1832, to implement the foregoing method or functions of the foregoing modules. Alternatively, at least one integrated circuit may be integrated into the chip, to implement the foregoing method or functions of the foregoing modules. Alternatively, the foregoing implementations may be combined, so that functions of some modules are implemented by invoking a program by a processing element, and functions of some modules are implemented in a form of an integrated circuit.

Regardless of a used manner, the communication apparatus includes at least one processing element, a storage element, and a communication interface, where the at least one processing element is configured to perform the method provided in the foregoing method embodiments. The processing element may perform some or all of the steps in the foregoing method embodiments in a first manner, that is, by executing a program stored in the storage element, or may perform some or all of the steps in the foregoing method embodiments in a second manner, that is, by using a hardware integrated logic circuit in the processing element in combination with an instruction. Certainly, the first manner and the second manner may also be combined to perform the method provided in the foregoing method embodiments.

The processing element herein is the same as that described above, and may be a general-purpose processor, for example, a central processing unit (Central Processing Unit, CPU), or may be one or more integrated circuits configured to implement the foregoing method, for example, one or more application-specific integrated circuits (Application Specific Integrated Circuits, ASICs), one or more microprocessors (digital signal processors, DSPs), or one or more field programmable gate arrays (Field Programmable Gate Arrays, FPGAs). The storage element may be one memory, or may be a general term of a plurality of storage elements.

Figure 19:
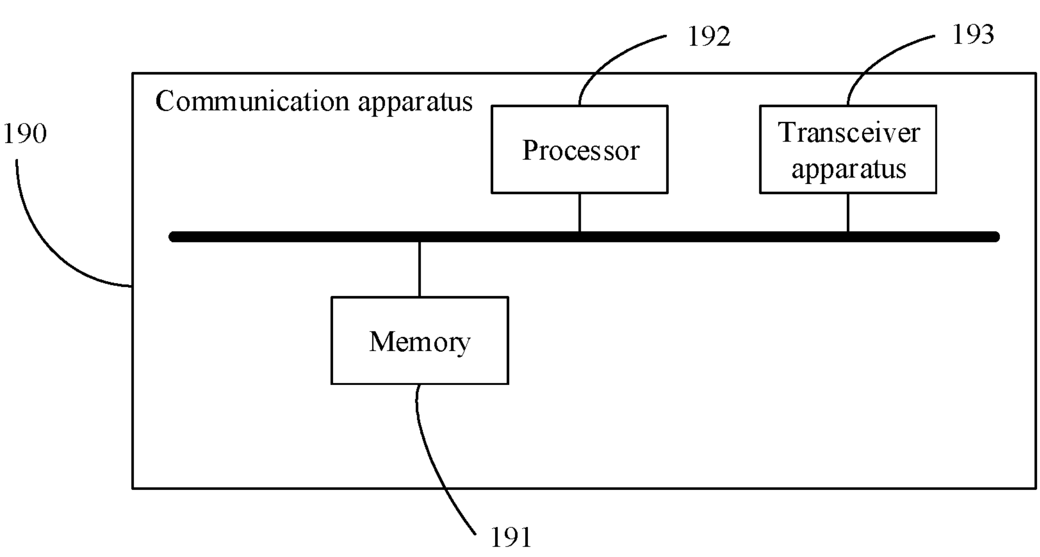
FIG. 19 is a schematic diagram of a structure of still another communication apparatus according to an embodiment of this application.

FIG. 19 is a schematic diagram of a structure of still another communication apparatus according to an embodiment of this application. As shown in FIG. 19, the communication apparatus 190 includes a processor 192 and a transceiver apparatus 193. The transceiver apparatus 193 may alternatively be a transceiver. The transceiver apparatus 193 receives a TA instruction from a network device, where the TA instruction includes an extended bit, the TA instruction is used to indicate a round-trip transmission delay or a round-trip transmission delay difference between the first device and the second device, and a quantity of bits of the TA instruction is greater than 12; and determines a quantity of extended bits and a location of the extended bit of the TA instruction based on a subcarrier spacing. Further, the apparatus further includes a memory 191, configured to store a computer program or instructions. The processor 192 is configured to invoke the program or the instructions.

The communication apparatus in the embodiment shown in FIG. 19 may be configured to perform the technical solutions in the foregoing method embodiments. For an implementation principle and a technical effect of the communication apparatus, further refer to related descriptions in the method embodiments. Details are not described herein again. The communication apparatus may be a terminal, or may be a component (for example, a chip or a circuit) of the terminal.

In FIG. 19, the transceiver apparatus 193 may be connected to an antenna. In a downlink direction, the transceiver apparatus 193 receives, by using the antenna, information sent by a base station, and sends the information to the processor 192 for processing. In an uplink direction, the processor 192 processes data of the terminal, and sends the processed data to the base station by using the transceiver apparatus 193.

Optionally, the processor 192 may be configured to implement a corresponding function of the determining module 1502 of the communication apparatus shown in FIG. 15, and the transceiver apparatus may be configured to implement a corresponding function of the receiving module 1501 of the communication apparatus shown in FIG. 15. Alternatively, the processor 192 may be configured to implement a corresponding function of the determining module 1702 of the communication apparatus shown in FIG. 17, and the transceiver apparatus may be configured to implement a corresponding function of the receiving module 1701 of the communication apparatus shown in FIG. 17.

Alternatively, some or all of the foregoing modules may be implemented in a form of an integrated circuit embedded in a chip of the terminal. In addition, the modules may be implemented separately, or may be integrated together. That is, the foregoing modules may be configured as one or more integrated circuits for implementing the foregoing method, for example, one or more application-specific integrated circuits (Application Specific Integrated Circuits, ASICs), one or more microprocessors (digital signal processors, DSPs), or one or more field programmable gate arrays (Field Programmable Gate Arrays, FPGAs).

An embodiment of this application further provides a computer-readable storage medium. The computer-readable storage medium stores a computer program. When the computer program is run on a computer, the computer is enabled to perform the timing advance indication method described in the foregoing embodiments.

In addition, an embodiment of this application further provides a computer program product. The computer program product includes a computer program. When the computer program product runs on a computer, the computer is enabled to perform the timing advance indication method described in the foregoing embodiments.

In addition, an embodiment of this application further provides a processor. The processor includes at least one circuit, configured to perform the timing advance indication method described in the foregoing embodiments.

In addition, an embodiment of this application further provides a system. The system includes the terminal and the network device described above.

All or some of the foregoing embodiments may be implemented by using software, hardware, firmware, or any combination thereof. When software is used for implementation, the embodiments may be implemented completely or partially in a form of a computer program product. The computer program product includes one or more computer instructions. When the computer program instruction is loaded and executed on a computer, the procedures or functions according to the embodiments of this application are all or partially generated. The computer may be a general-purpose computer, a special-purpose computer, a computer network, or another programmable apparatus. The computer instruction may be stored in a computer-readable storage medium, or may be transmitted from a computer-readable storage medium to another computer-readable storage medium. For example, the computer instruction may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk Solid State Disk), or the like.

Figure 20:
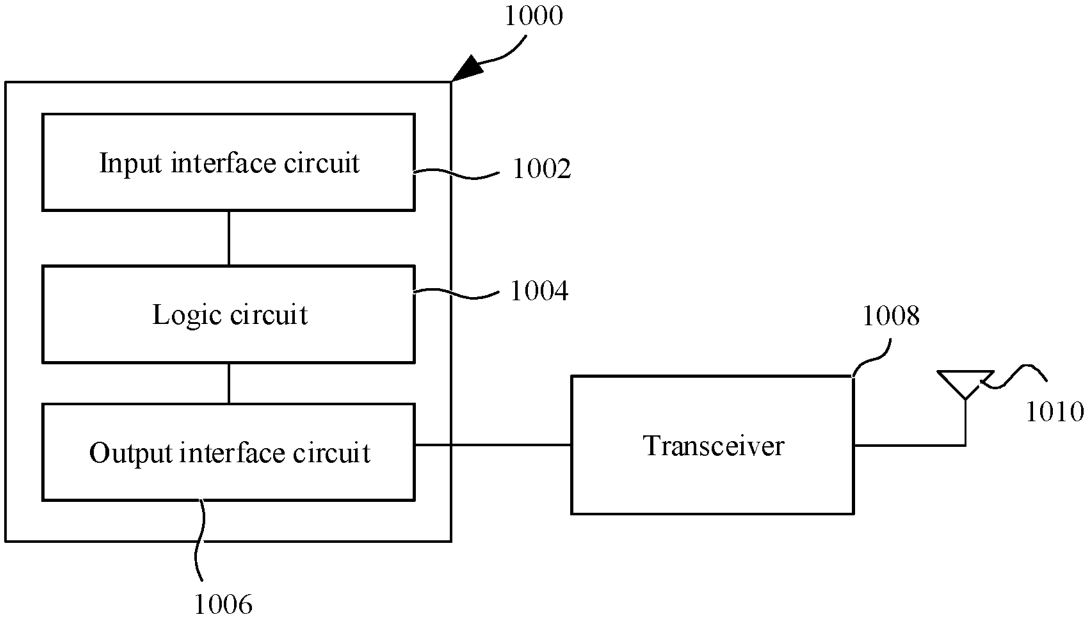
FIG. 20 is a schematic diagram of a structure of still another communication apparatus according to an embodiment of this application.

Based on a same invention idea as the method provided in the foregoing embodiments of this application, an embodiment of this application further provides a communication apparatus. The communication apparatus may be a terminal, or may be a component (for example, a chip or a circuit) of the terminal. Alternatively, the communication apparatus may be a network device, or may be a component (for example, a chip or a circuit) of the network device. The communication apparatus is configured to implement the method in the foregoing embodiments. A part or an entirety of the method in the foregoing embodiments may be implemented by hardware, or may be implemented by software. When hardware is used for implementation, as shown in FIG. 20, the communication apparatus 1000 includes an input interface circuit 1002, a logic circuit 1004, and an output interface circuit 1006. In addition, the communication apparatus 1000 further includes a transceiver 1008 and an antenna 1010. The transceiver 1008 receives and sends data by using the antenna 1010.

The logic circuit 1004 is configured to perform the timing advance indication method shown in FIG. 8 or FIG. 12. For details, refer to the descriptions in the foregoing method embodiments. Details are not described herein again. During specific implementation, the communication apparatus 1000 may be a chip or an integrated circuit.

What is claimed is:

1. A method, comprising:

determining, by a first device in a non-terrestrial network (NTN), whether a timing advance (TA) value indicated by a TA instruction meets a requirement of the NTN, wherein the requirement of the NTN includes a maximum value that needs to be represented by a TA time adjustment value, and the maximum value is determined based on a type of the NTN and a cell size of the NTN; and in response to determining that the TA value indicated by the TA instruction does not meet the requirement of the NTN:

determining, by the first device and based on a subcarrier spacing of a second device, a quantity of extended bits to be added to the TA instruction and a location in the TA instruction to add an extended to generate an extended TA instruction; and sending, by the first device, the extended TA instruction to the second device, wherein the extended TA instruction comprises the extended bit and indicates a round-trip transmission delay or a round-trip transmission delay difference between the first device and the second device, and a quantity of bits of the extended TA instruction is greater than 12.

2. The method according to claim 1, wherein determining the quantity of extended bits and the location of the extended bit for the TA instruction comprises:

determining, by the first device, the quantity of extended bits and the location of the extended bit for the TA instruction based on the subcarrier spacing of the second device and a size of a cell to which the second device belongs.

3. The method according to claim 1, wherein the quantity of extended bits and the location of the extended bit comprise at least one of the following:

one bit reserved in a random access response (RAR);

two bits reserved in a backoff indicator (BI);

one bit reserved in an uplink grant (UL-grant);

at least one bit reused in a temporary cell radio network temporary identifier (TC-RNTI); or one bit indicating whether a slot number corresponding to the RAR is an odd number or an even number.

4. The method according to claim 3, wherein the at least one bit corresponding to the TC-RNTI is a low-order bit of a TA value indicated by the extended TA instruction.

5. The method according to claim 1, wherein the extended TA instruction includes a first part and a second part, the first part includes the extended bits, and the second part includes the TA instruction and is a 12-bit part.

6. The method according to claim 1, further comprising:

in response to determining that the TA value indicated by the TA instruction meets the requirement of the NTN, sending, by the first device, the TA instruction to the second device.

7. The method according to claim 1, before determining whether the TA value indicated by the TA instruction meets the requirement of the NTN, the method further comprising:

configuring, by the first device and for the second device, the subcarrier spacing of the second device.

8. The method according to claim 1, wherein the first device determines whether the TA value indicated by the TA instruction meets the requirement of the NTN when the first device needs to send the TA instruction to the second device.

9. The method according to claim 1, wherein the determined quantity of extended bits to be added to the TA instruction increases from one bit as the subcarrier spacing of the second device increases.

10. A method, comprising:

receiving, by a second device in a non-terrestrial network (NTN), an extended timing advance (TA) instruction from a first device, wherein the extended TA instruction is generated by the first device based on determining that a TA value indicated by a TA instruction does not meet a requirement of the NTN, the requirement of the NTN includes a maximum value that needs to be represented by a TA time adjustment value, the maximum value is determined based on a type of the NTN and a cell size of the NTN, the extended TA instruction comprises an extended bit and indicates a round-trip transmission delay or a round-trip transmission delay difference between the first device and the second device, and a quantity of bits of the extended TA instruction is greater than 12; and determining, by the second device, a quantity of extended bits added to the TA instruction and a location of the extended bit in the extended TA instruction based on a subcarrier spacing of the second device.

11. The method according to claim 10, wherein the method further comprises:

after determining the quantity of extended bits and the location of the extended bit of the extended TA instruction, sending, by the second device, data to the first device based on a TA value indicated by the extended TA instruction.

12. The method according to claim 10, wherein determining the quantity of extended bits and the location of the extended bit of the extended TA instruction comprises:

determining, by the second device, the quantity of extended bits and the location of the extended bit of the extended TA instruction based on the subcarrier spacing of the second device and a size of a cell to which the second device belongs.

13. The method according to claim 10, wherein the quantity of extended bits and the location of the extended bit comprise at least one of the following:

one bit reserved in a random access response (RAR);
two bits reserved in a backoff indicator (BI);
one bit reserved in an uplink grant (UL-grant);
at least one bit reused in a temporary cell radio network temporary identifier (TC-RNTI); or
one bit indicating whether a slot number corresponding to the RAR is an odd number or an even number.

14. The method according to claim 13, wherein the at least one bit corresponding to the TC-RNTI is a low-order bit of a TA value indicated by the extended TA instruction.

15. A communication apparatus, comprising a memory and at least one processor, wherein the memory is coupled to the at least one processor and stores programming instructions for execution by the at least one processor to cause the communication apparatus to perform operations comprising:

determining whether a timing advance (TA) value indicated by a TA instruction meets a requirement of a non-terrestrial network (NTN), wherein the requirement of the NTN includes a maximum value that needs to be represented by a TA time adjustment value, and the maximum value is determined based on a type of the NTN and a cell size of the NIN; and in response to determining that the TA value indicated by the TA instruction does not meet the requirement of the NTN:

determining, based on a subcarrier spacing of a second device, a quantity of extended bits to be added to the TA instruction and a location in the TA instruction to add an extended bit to generate an extended TA instruction; and sending the extended TA instruction to the second device, wherein the extended TA instruction comprises the extended bit and indicates a round-trip transmission delay or a round-trip transmission delay difference between the communication apparatus and the second device, and a quantity of bits of the extended TA instruction is greater than 12.

16. The communication apparatus according to claim 15, wherein determining the quantity of extended bits and the location of the extended bit for the TA instruction comprises:

determining the quantity of extended bits and the location of the extended bit for the TA instruction based on the subcarrier spacing of the second device and a size of a cell to which the second device belongs.

17. The communication apparatus according to claim 15, wherein the quantity of extended bits and the location of the extended bit comprise at least one of the following:

one bit reserved in a random access response (RAR);
two bits reserved in a backoff indicator (BI);
one bit reserved in an uplink grant (UL-grant);
at least one bit reused in a temporary cell radio network temporary identifier (TC-RNTI); or
one bit indicating whether a slot number corresponding to the RAR is an odd number or an even number.

18. The communication apparatus according to claim 17, wherein the at least one bit corresponding to the TC-RNTI is a low-order bit of a TA value indicated by the extended TA instruction.

19. The communication apparatus according to claim 15, wherein the operations further comprise:

in response to determining that the TA value indicated by the TA instruction meets the requirement of the NTN, sending the TA instruction to the second device.

20. The communication apparatus according to claim 15, wherein before determining whether the TA value indicated by the TA instruction meets the requirement of the NTN, the operations further comprise:

configuring the subcarrier spacing of the second device for the second device.

* * * * *